(12) United States Patent
Hosaka

(10) Patent No.: US 9,728,219 B2
(45) Date of Patent: Aug. 8, 2017

(54) OPTICAL INFORMATION REPRODUCTION DEVICE AND OPTICAL INFORMATION REPRODUCTION METHOD

(71) Applicant: HITACHI, LTD., Tokyo (JP)

(72) Inventor: Makoto Hosaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/781,676

(22) PCT Filed: Apr. 8, 2013

(86) PCT No.: PCT/JP2013/060575
§ 371 (c)(1),
(2) Date: Oct. 1, 2015

(87) PCT Pub. No.: WO2014/167620
PCT Pub. Date: Oct. 16, 2014

(65) Prior Publication Data
US 2016/0055876 A1    Feb. 25, 2016

(51) Int. Cl.
*G11B 7/0065*    (2006.01)
*G11B 7/1381*    (2012.01)
(Continued)

(52) U.S. Cl.
CPC .............. *G11B 7/0065* (2013.01); *G11B 7/09* (2013.01); *G11B 7/1353* (2013.01);
(Continued)

(58) Field of Classification Search
None
See application file for complete search history.

(56) References Cited

U.S. PATENT DOCUMENTS

| 2004/0179251 A1 | 9/2004 | Anderson et al. |
| 2008/0192311 A1 | 8/2008 | Horimai |

(Continued)

FOREIGN PATENT DOCUMENTS

| CN | 102385874 A | 3/2012 |
| JP | 2004-272268 A | 9/2004 |

(Continued)

OTHER PUBLICATIONS

International Search Report of PCT/JP2013/060575.
(Continued)

*Primary Examiner* — Brian Butcher
(74) *Attorney, Agent, or Firm* — Mattingly & Malur, PC

(57) ABSTRACT

An optical information recording/reproduction device is capable of appropriately correcting the angle of a reference beam during data reproduction even when a wavelength deviation or an angle deviation in multiplexing and vertical directions of the reference beam occurs in a holographic memory recording medium. The optical information reproduction device has a laser light source that generates a reference beam; an image-capturing unit that detects a diffraction ray to be reproduced from the optical information recoding medium; and an optical detection unit that has at least two light-receiving surfaces and is used for detecting a diffraction ray reproduced by irradiating the reference beam on the optical information recording medium. The device also has a light-shielding unit that shields part of the diffraction ray detected by the optical detection unit; and an error signal calculation unit that generates an error signal from a detection signal outputted by the optical detection unit.

17 Claims, 19 Drawing Sheets

(51) Int. Cl.
    *G11B 7/1353*     (2012.01)
    *G11B 20/10*     (2006.01)
    *G11B 7/09*     (2006.01)
    *G11B 7/00*     (2006.01)
    *G11B 7/085*     (2006.01)
    *G11B 7/13*     (2012.01)

(52) U.S. Cl.
    CPC ...... *G11B 7/1381* (2013.01); *G11B 20/10305* (2013.01); *G11B 7/08564* (2013.01); *G11B 7/0943* (2013.01); *G11B 7/13* (2013.01); *G11B 2007/0009* (2013.01)

(56) References Cited

U.S. PATENT DOCUMENTS

2011/0261671 A1    10/2011    Ishii et al.
2012/0050831 A1*    3/2012    Shimada ............... G11B 7/083
                                                    359/22

FOREIGN PATENT DOCUMENTS

| | | |
|---|---|---|
| JP | 2006-268933 A | 10/2006 |
| JP | 2007-240820 A | 9/2007 |
| JP | 2008-197575 A | 8/2008 |
| JP | 2009-216759 A | 9/2009 |
| JP | 2011-146098 A | 7/2011 |
| JP | 2011-227967 A | 11/2011 |
| JP | 2011-253600 A | 12/2011 |
| WO | 2004/102542 A1 | 11/2004 |
| WO | 2009/044470 A1 | 4/2009 |

OTHER PUBLICATIONS

Japanese Office Action received in corresponding Japanese Application No. 2015-510967 dated Nov. 29, 2016 and a partial translation thereof.

Chinese Office Action received in corresponding Chinese Application No. 201380075390.2 dated Feb. 21, 2017.

* cited by examiner

FIG. 8
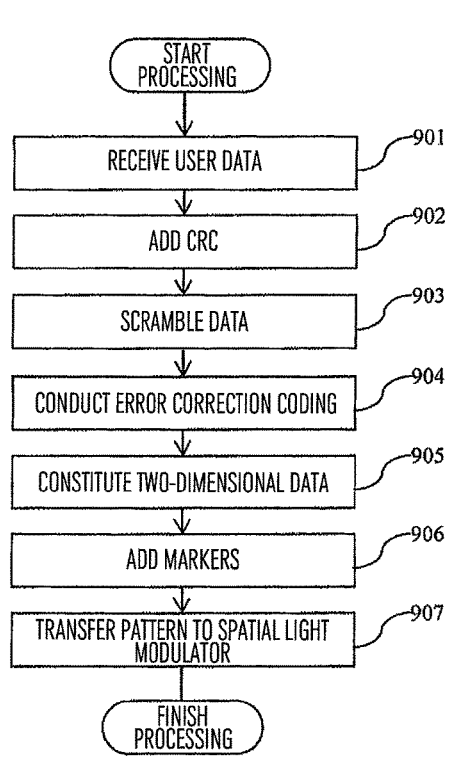
(a)
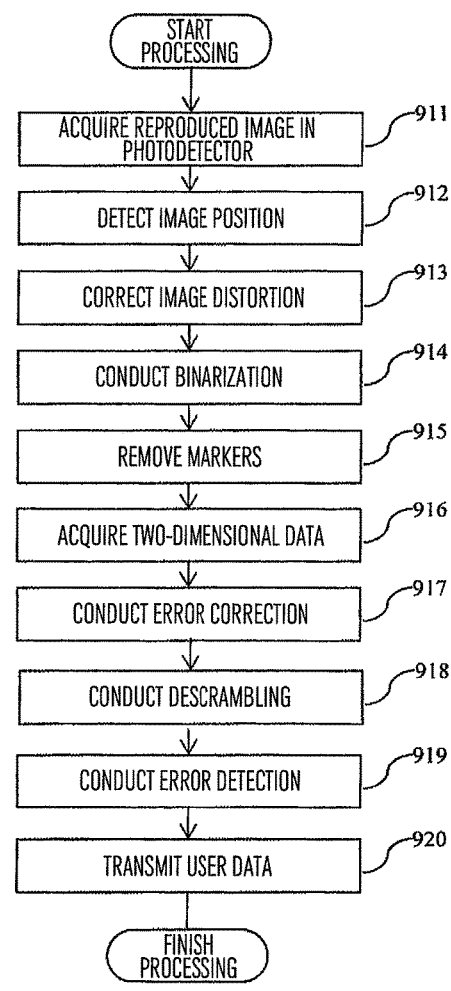
(b)

(1)  (2)

FIG. 13
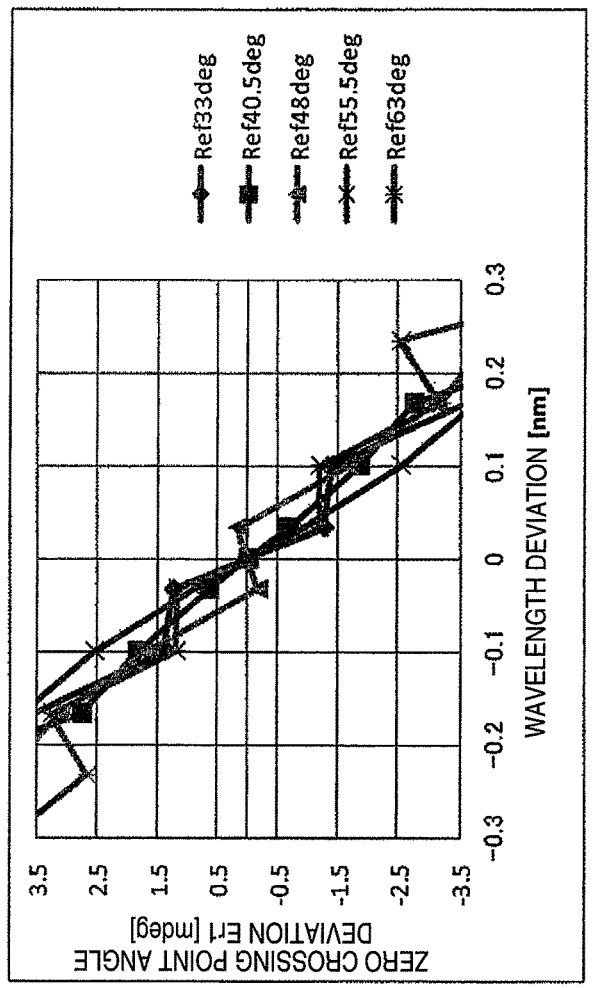
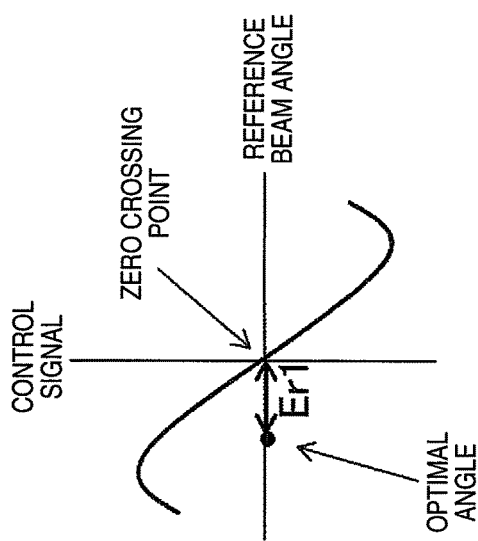

OPTICAL INFORMATION REPRODUCTION DEVICE AND OPTICAL INFORMATION REPRODUCTION METHOD

TECHNICAL FIELD

The present invention relates to an optical information reproduction device and an optical information reproduction method, which reproduce information by using holography.

BACKGROUND ART

At the present time, merchandising of an optical disc having a recording density of approximately 100 GB is possible for consumer use as well owing to Blu-ray Disc™ standard using a blue-violet semiconductor laser. Hereafter, implementation of a large capacity exceeding 500 GB is desired in the optical disc as well. For implementing such an ultrahigh density in the optical disc, however, a high density technique according to a new system different from the conventional high density technique using a shorter wavelength and a higher NA of the object lens is necessary.

In the midst of studies concerning a storage technique of next generation, the hologram recording technique of recording digital information by utilizing the holography attracts attention. As for the hologram recording technique, there is, for example, JPA-2004-272268 (Patent Literature 1). JP-A-2004-272268 describes the so-called angular multiplexing recording system, in which different page data is displayed on a spatial light modulator while an angle of incidence of a reference beam onto optical information storage medium is changed and multiplexing recording is conducted. In addition, JP-A-2004-272268 describes a technique of shortening the spacing between adjacent holograms by focusing a signal beam with a lens and disposing an aperture (spatial filter) in its beam waist.

Furthermore, as for the hologram recording technique, there is, for example, WO 2004/102542 (Patent Literature 2). In an example using a shift multiplexing system described in WO 2004/102542, a beam from inner pixels is used as a signal beam and a beam from outer strip shaped pixels is used as a reference beam in one spatial light modulator. Both beams are focused onto optical information storage medium by using the same lens. The signal beam and the reference beam are caused to interfere with each other in the vicinity of a focal plane of the lens, and holograms are recorded.

Also, as technology of optimizing a reference beam angle at the time of reproduction, there is, for example, JP-A-2011-227967 (Patent Literature 3). In JPA-2011-227967, there is description "a photodetector detects the diffracted beam diffracted by radiating the adjusting beam having the frequency and phase distributions partially the same as those of the signal beam upon recording to the optical information storage medium, and an angel at which a reference beam is incident on the optical information storage medium is controlled based on detected information."

Also, as technology of disposing light-shielding means before a photodetector at the time of reproduction, there is, for example, JP-A-2011-146098 (Patent Literature 4). In JP-A-2011-146098, there is description "According to a hologram recording/reproduction device of the present invention, at the time of data reproduction, a first region in which one of an information recovered beam and a reference recovered beam is incident on an optical member for light-shielding and a second region in which the other one is incident are set by optical member control means for light-shielding. Also, optical characteristics of pixels arranged in the first region are controlled such that a beam incident on the first region is incident on a light-receiving part, and optical characteristics of pixels arranged in the second region are controlled such that a beam incident on the second region is not incident on the light-receiving part. Since the optical characteristics of pixels of an optical member for light-shielding are controlled as describe above, the beam incident on the first region (one beam of the information recovered beam and the reference recovered beam) is incident on the light-receiving part and the beam incident on the second region (the other beam of the information recovered beam and the reference recovered beam) is not incident on the light-receiving part."

CITATION LIST

Patent Literatures

Patent Literature 1: JP-A-2004-272268
Patent Literature 2: WO 2004/102542
Patent Literature 3: JP-A-2011-227967
Patent Literature 4: JP-A-2011-146098

SUMMARY OF INVENTION

Technical Problem

On the other hand, the optical information reproduction device using holography has a problem that sufficient reproduction characteristics are not obtained when a reference beam angle is not appropriately set at the time of reproduction. In the technology disclosed in Patent Literature 3, there is a problem that it is necessary to apply the adjustment beam in order to calculate an appropriate reference beam angle whenever required and a transmission speed is lowered. Also, in the optical information reproduction device using holography, since a reproduced-light quantity is largely changed depending on a wavelength deviation, a control signal robust to the wavelength deviation is required but technology to solve the problem is not disclosed in the aforementioned Patent Literatures. Also, in angular multiplexing, an angle deviation in a direction perpendicular to multiplexing of the reference beam is problematic in addition to the wavelength deviation.

The present invention has been achieved in view of the above-described problem. It is an object of the present invention to provide an optical information reproduction device and an optical information reproduction method, capable of reproducing data stably in an optical information reproduction device utilizing holography.

Solution to Problem

The above-described problem is solved by the present invention as disclosed in, for example, the claims.

Advantageous Effects of Invention

According to the present invention, it is possible to provide an optical information reproduction device and an optical information reproduction method, capable of reproducing data stably in a hologram memory.

BRIEF DESCRIPTION OF DRAWINGS

FIG. 8 is a schematic diagram illustrating an embodiment of an operation flow of a signal generation circuit and a signal processing circuit.

FIG. 13 is a diagram illustrating a simulation result of a relationship between a zero crossing point angle deviation quantity of a servo control signal of a galvanometer mirror and a wavelength deviation quantity.

DESCRIPTION OF EMBODIMENTS

Hereinafter, embodiments of the present invention will be described with reference to the drawings.

Embodiment 1

A first embodiment of the present invention will be described with reference to FIGS. 1 to 16.

Figure 1:
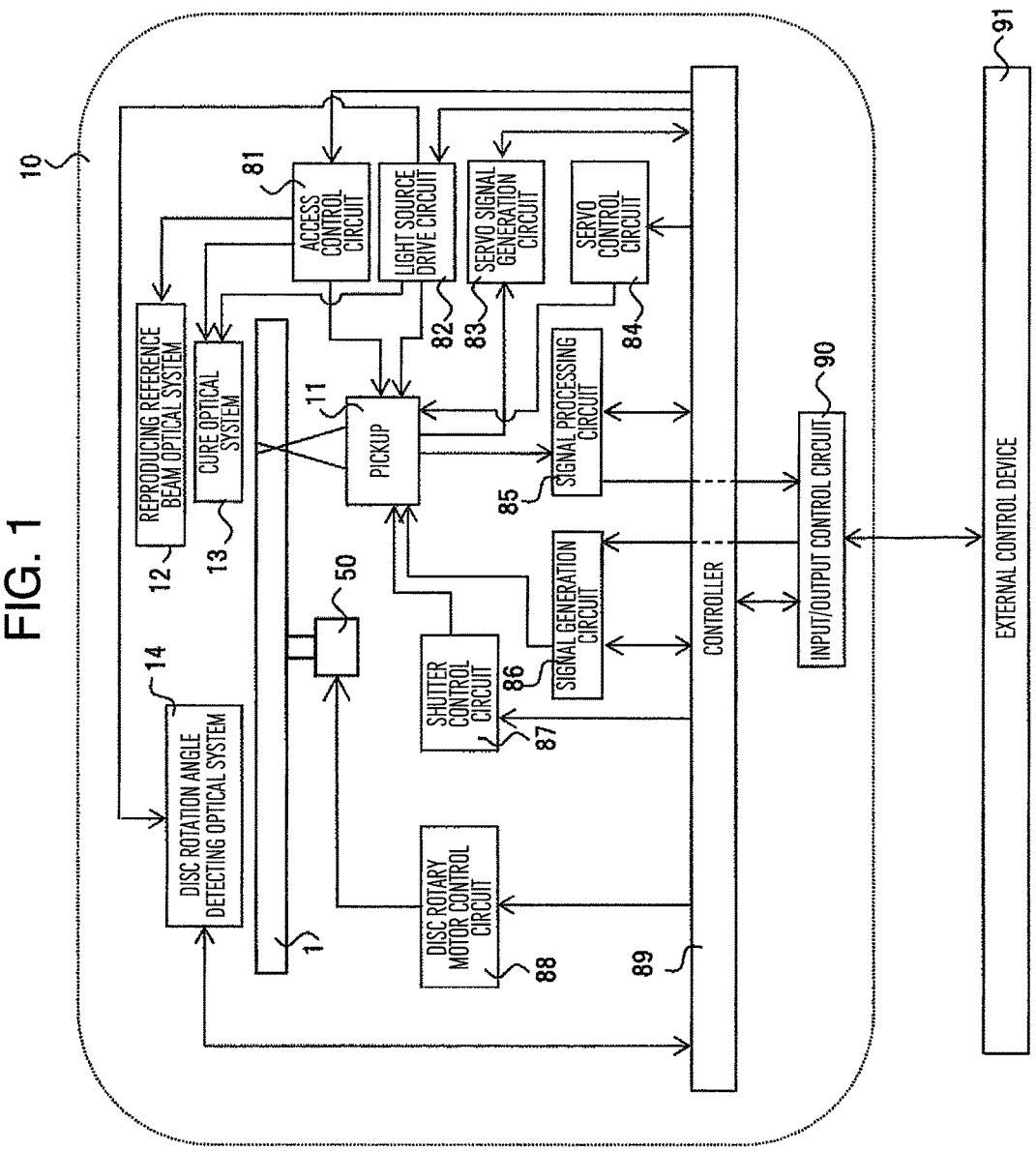
FIG. 1 is a schematic diagram illustrating an embodiment of an optical information recording/reproduction device.

FIG. 1 is a block diagram of a recording/reproduction device for an optical information storage medium, which records and/or reproduces digital information by using holography.

An optical information recording/reproduction device 10 is connected to an external control device 91 through an input/output control circuit 90. At the time of recording, the optical information recording/reproduction device 10 receives an information signal to be recorded, from the external control device 91 by the input/output control circuit 90. At the time of reproduction, the optical information recording/reproduction device 10 transmits a reproduced information signal to the external control device 91 through the input/output control circuit 90.

The optical information recording/reproduction device 10 includes a pickup 11, a reproducing reference beam optical system 12, a cure optical system 13, a disc rotation angle detecting optical system 14 and a rotary motor 50. An optical information storage medium 1 is configured to be capable of being rotated by the rotary motor 50.

The pickup 11 plays a role of emitting a reference beam and a signal beam onto the optical information storage medium 1 and recording digital information on the storage medium by utilizing holography. At this time, an information signal to be recorded is sent into a spatial light modulator in the pickup 11 via a signal generation circuit 86 by a controller 89, and the signal beam is modulated by the spatial light modulator.

When reproducing information recorded on the optical information storage medium 1, the reproducing reference beam optical system 12 generates a light wave to cause the reference beam emitted from the pickup 11 to be incident on the optical information storage medium in a sense opposite to that at the time of recording. A photodetector in the pickup 11, which will be described below, detects a recovered beam reproduced by using the reproducing reference beam. A signal processing circuit 85 reproduces a signal.

The controller 89 controls open/close time of a shutter in the pickup 11 via a shutter control circuit 87. As a result, exposure time of the reference beam and the signal beam with which the optical information storage medium 1 is irradiated can be adjusted.

The cure optical system 13 plays a role of generating a light beam used in pre-cure and post-cure of the optical information storage medium 1. The pre-cure is a pre-process of irradiating a desired position in the optical information storage medium 1 with a predetermined light beam before irradiating the desired position with the reference beam and the signal beam when recording information in the desired position. The post-cure is a post-process of irradiating a desired position in the optical information storage medium 1 with a predetermined light beam to make rewriting impossible after information is recorded in the desired position.

The disc rotation angle detecting optical system 14 is used to detect a rotation angle of the optical information storage medium 1. When adjusting the optical information storage medium 1 to a predetermined rotation angle, the disc rotation angle detecting optical system 14 detects a signal depending upon the rotation angle and the controller 89 can control the rotation angle of the optical information storage medium 1 via a disc rotary motor control circuit 88 by using the detected signal.

A light source drive circuit 82 supplies a predetermined light source drive current to light sources in the pickup 11, the cure optical system 13, and the disc rotation angle detecting optical system 14. Light sources can emit light beams with predetermined light quantities, respectively.

Furthermore, as for each of the pickup 11 and the disc cure optical system 13, a mechanism capable of sliding a position in a radial direction of the optical information storage medium 1 is provided. Position control is exercised via an access control circuit 81.

The recording technique utilizing the principle of the angular multiplexing of holography has tendency that an allowable error for angle deviation of the reference beam becomes extremely small.

Therefore, it becomes necessary that a mechanism for detecting a deviation quantity of the reference beam angle is provided in the pickup 11, a servo signal generation circuit 83 generates a signal for servo control, and a servo mechanism for correcting the deviation quantity via a servo control circuit 84 is provided in the optical information recording/reproduction device 10. According to the present invention, it is possible to improve resistance to a wavelength deviation and an angle deviation in a direction perpendicular to multiplexing of a reference beam by shielding a part of a reproduced signal from hologram for generating a signal for servo control as described below.

Furthermore, as for the pickup 11, the cure optical system 13, and the disc rotation angle detecting optical system 14, several optical system configurations or all optical system configurations may be collected to one configuration and simplified.

Figure 2:
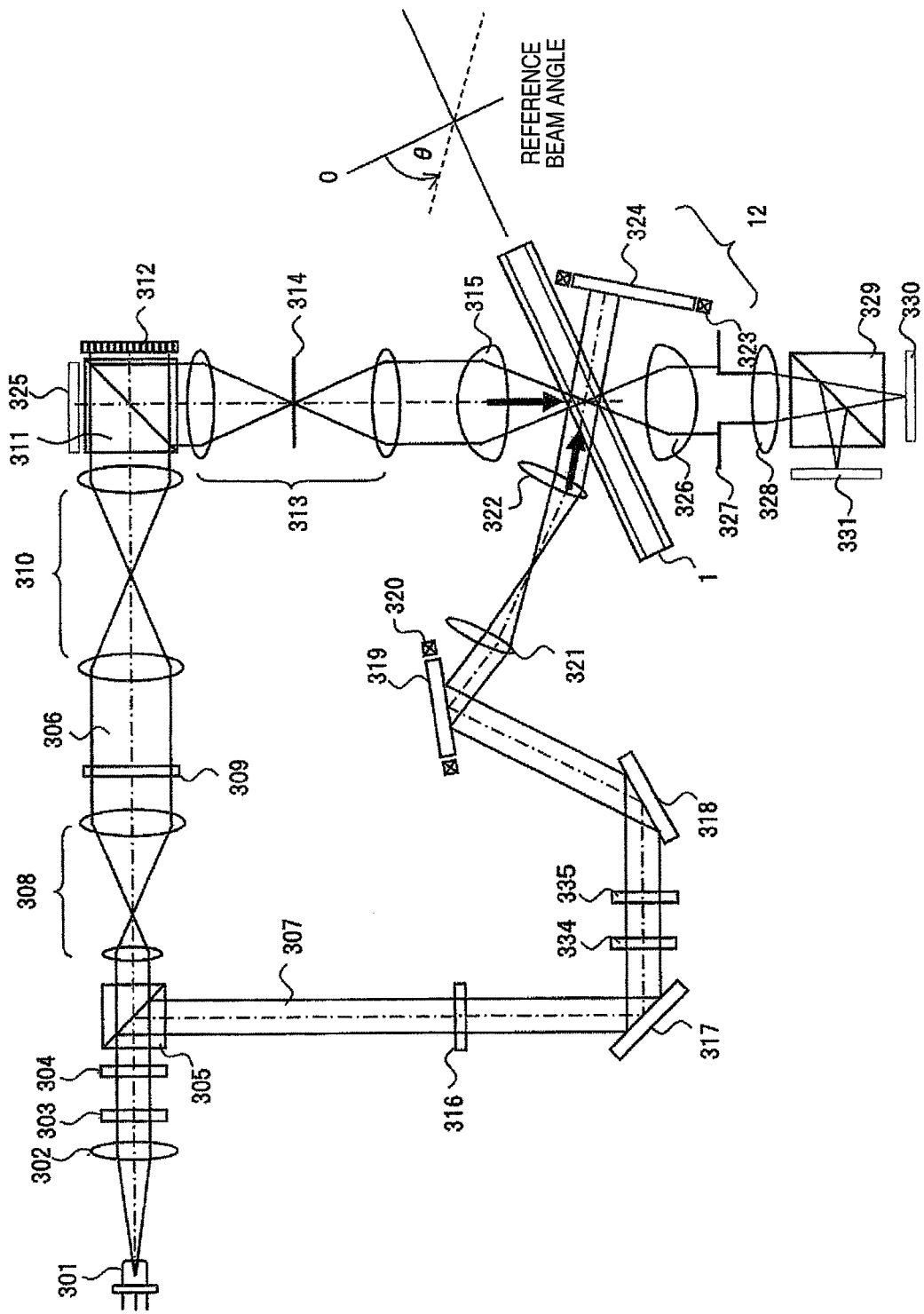
FIG. 2 is a schematic diagram illustrating an embodiment of a pickup of the optical information recording/reproduction device.

FIG. 2 illustrates a recording principle in an example of a basic optical system configuration of the pickup 11 in the optical information recording/reproduction device 10. A light beam emitted from a light source 301 passes through a collimating lens 302 and is incident on a shutter 303. When the shutter 303 is open, the light beam passes through the shutter 303. Then, the light beam is controlled in polarization direction to have a light quantity ratio between p-polarized beam and s-polarized beam set to a desired ratio by an optical element 304 including, for example, a half-wave plate. Then, the light beam is incident on a PBS (Polarization Beam Splitter) prism 305.

The light beam which has passed through the PBS prism 305 functions as a signal beam 306. After being expanded in light beam diameter by a beam expander 308, the signal beam passes through a phase mask 309, a relay lens 310 and a PBS prism 311 and is incident on a spatial light modulator 312.

The signal beam added with information by the spatial light modulator 312 is reflected by the PBS prism 311, and propagates through a relay lens 313 and a spatial filter 314. Then, the signal beam is focused onto the optical information storage medium 1 by an object lens 315.

On the other hand, the light beam reflected by the PBS prism 305 functions as a reference beam 307. The reference beam 307 is set to a predetermined polarization direction depending upon whether to conduct recording or reproducing by a polarization direction conversion element 316. Then, the reference beam 307 is incident on a galvanometer mirror 319 via a mirror 317 and a mirror 318. In this case, a beam component of servo is generated in addition to a general beam component for reproduction by slightly changing a polarization direction by a wavelength plate 334 at the time of reproduction. In the drawing, the p-polarized beam is a beam component for reproduction and the s-polarized beam is a beam component for servo. Thereafter, angles of the p-polarized beam and the s-polarized beam in a multiplexing direction are separated by a desired angle by a polarization separation element 335, such as a Wollaston prism or the like. Also, at the time of recording, the wavelength plate 334 is set at an angle which does not give a change in a polarization direction. Since the galvanometer mirror 319 can be adjusted in angle by an actuator 320, an angle of incidence of the reference beam incident on the optical information storage medium 1 after passing through a lens 321 and a lens 322 can be set to a desired angle. In order to set the angle of incidence of the reference beam, an element that converts a wavefront of the reference beam may be used instead of the galvanometer mirror. In the present specification, the reference beam angle is defined in such a way that a direction in which a scanning range of the reference beam angle is large is defined as a + direction and an opposite direction thereto is defined as a − direction in a plane in which at least two or more reference beams of which angles are changed by the actuator 320 exist when a direction perpendicular to the optical information storage medium as illustrated in the drawing is set to 0°.

In this way, the signal beam and the reference beam are incident on the optical information storage medium 1 to overlap each other. As a result, an interference pattern is formed in the storage medium. Information is recorded by writing this pattern into the storage medium. Furthermore, since the angle of incidence of the reference beam incident on the optical information storage medium 1 can be changed by the galvanometer mirror 319, recording using angular multiplexing is possible.

Hereafter, in holograms recorded in the same area with the reference beam angle changed, a hologram corresponding to each reference beam angle is referred to as page, and a set of pages angular-multiplexed in the same area is referred to as book.

Figure 3:
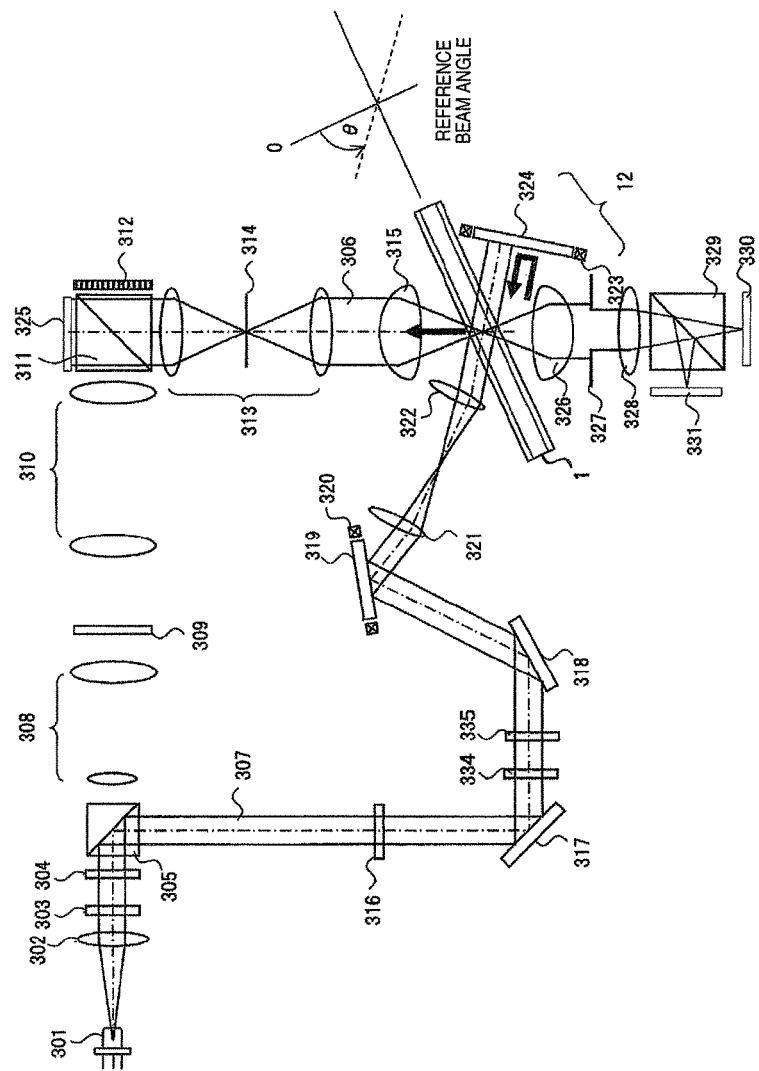
FIG. 3 is a schematic diagram illustrating an embodiment of a pickup of the optical information recording/reproduction device.

FIG. 3 illustrates a principle of reproducing in an example of a basic optical system configuration of the pickup 11 in the optical information recording/reproduction device 10. When reproducing recorded information, the reference beam is incident on the optical information storage medium 1 as described above and a light beam that has passed through the optical information storage medium 1 is reflected by a galvanometer mirror 324 which can be adjusted in angle by an actuator 323. As a result, a reference beam for reproducing is generated.

A recovered beam reproduced by using the reproducing reference beam propagates through the object lens 315, the relay lens 313 and the spatial filter 314. Then, the recovered beam passes through the PBS prism 311 and is incident on a photodetector 325, and the recorded signal can be reproduced. As the photodetector 325, an imaging element such as, for example, a CMOS image sensor or a CCD image sensor, can be used. However, any element may be used as long as the element can reproduce page data.

A signal for servo control for controlling the galvanometer mirror 319 in order to set a reference beam angle is generated by an optical system under the disc 1, for example, as illustrated in the drawing. A recovered beam from hologram is converted to a parallel beam by the lens 326, and a part of a signal is shielded by the light-shielding mask 327. Resistance to the wavelength deviation or the angle deviation in a direction perpendicular to the multiplexing of the reference beam is improved due to the present light-shielding mask. Thereafter, the beam is converted to a convergent beam by, for example, a lens 328, and is then separated into a p-polarized beam and an s-polarized beam by a PBS prism 328. The respective beams are detected by photodetectors 330 and 331. The signal for servo control is calculated by performing a differential operation of signals obtained by, for example, the photodetectors 330 and 331. In this case, the maximum values and the minimum value of the signals obtained by, for example, the photodetectors 330 and 331 may be corrected to be identical to each other and thereafter, the differential operation may be performed. Also, in the case of using the control signal obtained by performing, for example, the differential operation as described above, the p-polarized beam and the s-polarized beam which are incident on an upper surface of the disc are applied in a state of being deviated from an optimal angle for reproducing hologram in opposite directions from each other. Also, in the case of reflecting the beam by a galvanometer mirror 324, the angle is changed by, for example, half a separation angle of the p-polarized beam and the s-polarized beam so as to be an optimal angle for reproducing hologram. Also, the light-shielding mask may be implemented by using an aperture to physically shield light or a liquid crystal element to electrically control blocking and transmission.

In the case of using the control signal obtained by performing the differential operation as described above, the p-polarized beam and the s-polarized beam which are incident on the upper surface of the disc are applied in a state of being deviated from the optimal angles for reproducing hologram in the opposite directions from each other. Therefore, control may be performed at the zero crossing point of the control signal and thereafter, optimal angles may be set by changing the reference beam angle by a predetermined angle, for example, half the separation angle of the p-polarized beam and the s-polarized beam so as to be an optimal angles for reproducing hologram by using, for example, an encoder of the galvanometer mirror. In this case, in the case of reflecting the beam by the galvanometer mirror 324, the reference beam angle at the optimal angle is reflected, for example, perpendicularly.

Figure 4:
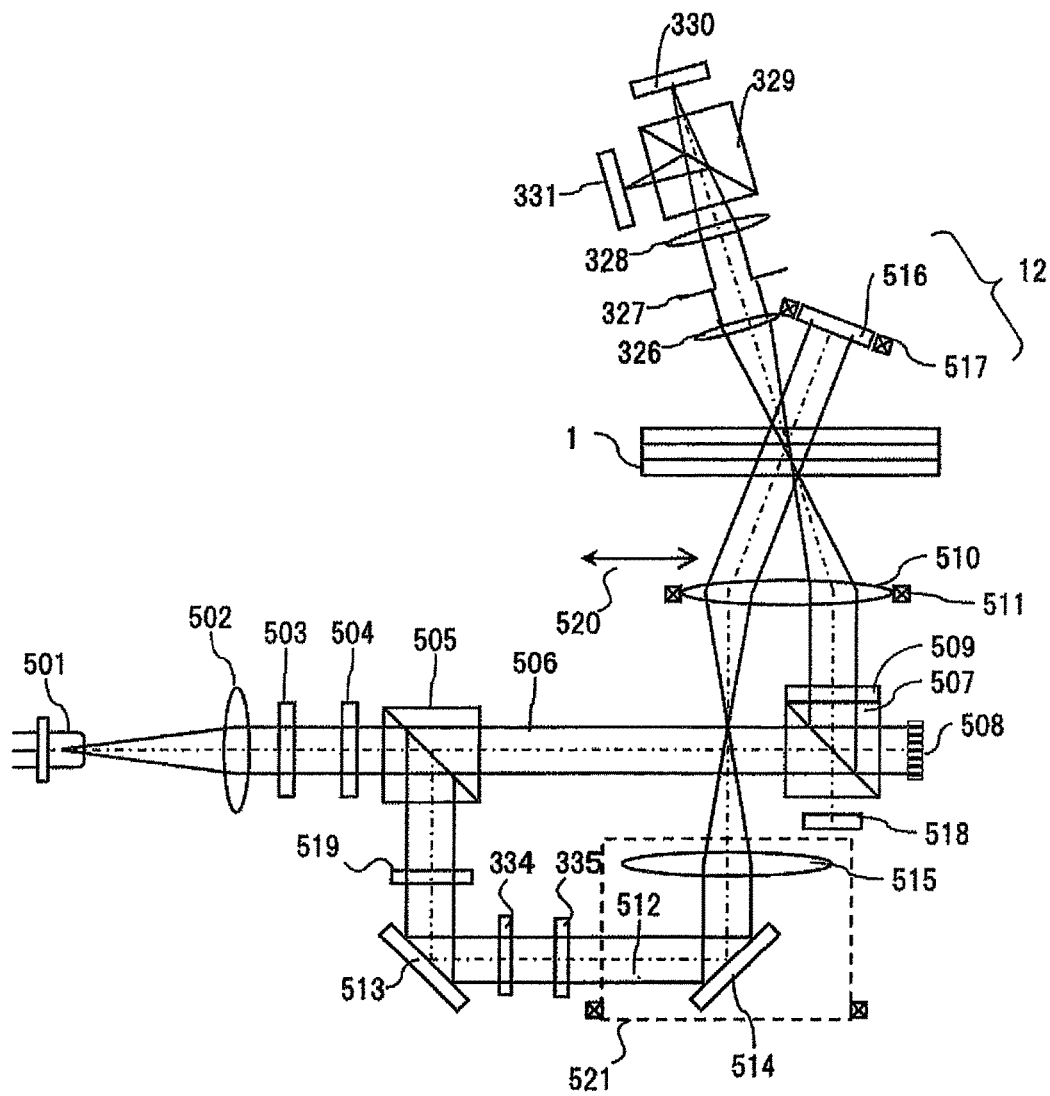
FIG. 4 is a schematic diagram illustrating an embodiment of a pickup of the optical information recording/reproduction device.

FIG. 4 is a diagram illustrating a different configuration of the pickup 11. In FIG. 4, a light beam emitted from a light source 501 passes through a collimating lens 502, and is incident on a shutter 503. When the shutter 503 is open, the light beam passes through the shutter 503. Then, the light beam is controlled in polarization direction to have a light quantity ratio between p-polarized light and s-polarized light set to a desired ratio by an optical element 504 including, for example, a half-wave plate. Then, the light beam is incident on a PBS prism 505.

The light beam which has passed through the PBS prism 505 is incident on a spatial light modulator 508 via a PBS prism 507. A signal beam 506 added with information by the spatial light modulator 508 is reflected by the PBS prism 507, and propagates through an angle filter 509 which passes through only a light beam of a predetermined angle of incidence. Then, the signal beam is focused onto the hologram storage medium 1 by an object lens 510.

On the other hand, the light beam reflected by the PBS prism 505 functions as a reference beam 512. The reference beam 512 is set to a predetermined polarization direction depending upon whether to conduct recording or reproducing by a polarization direction conversion element 519. Then, the reference beam 512 is incident on a lens 515 via a mirror 513 and a mirror 514. The lens 515 plays a role of focusing the reference beam 512 on a back focus plane of the object lens 510. The reference beam focused on the back focus plane of the object lens 510 once is converted to a parallel beam again by the object lens 510 and incident on the hologram storage medium 1. In this case, a beam component of servo is generated in addition to a general beam component for reproduction by slightly changing a wavelength plate 334 at the time of reproduction. In the drawing, the p-polarized beam is a beam component for reproduction and the s-polarized beam is a beam component for servo. Thereafter, angles of the p-polarized beam and the s-polarized beam in a multiplexing direction are separated by a desired angle by a polarization separation element 335, such as Wollaston prism or the like. Also, at the time of recording, the wavelength plate 334 is set at an angle which does not give a change in a polarization direction.

Figure 18:
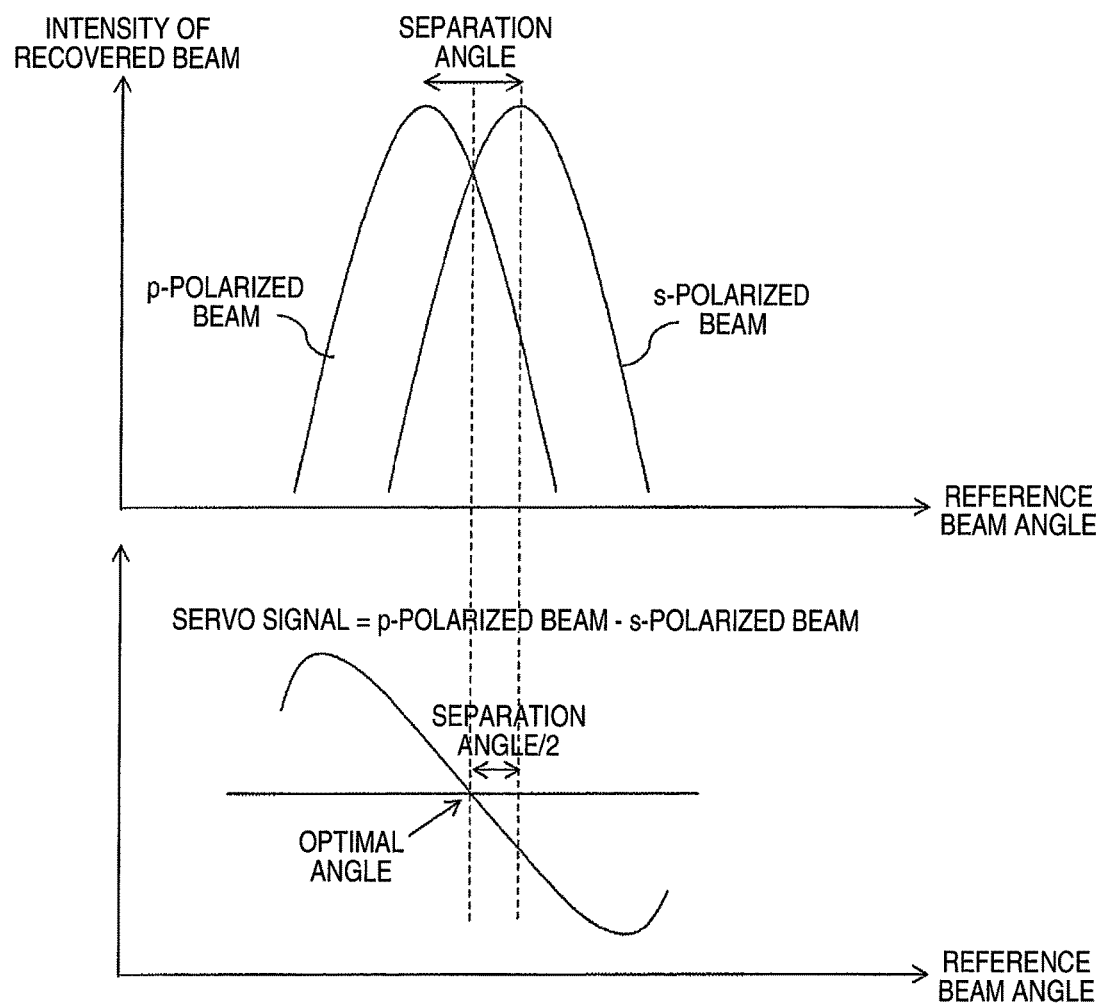
FIG. 18 is a diagram illustrating an example of a Bragg selective curve of a reproduced signal and an angle error signal (servo signal) of a reference beam in an optical information recording/reproduction device of an ideal state.

As illustrated in FIG. 18, a diffracted beam in the case of performing reproduction using the s-polarized beam and a diffracted beam in the case of performing reproduction using the p-polarized beam represent peaks at positions deviated by an angle corresponding to the separation angle of the polarization separation element such as Wollaston prism. In this case, a signal having a difference between the diffracted beams of the p-polarized beam and the s-polarized beam has an s-shaped waveform as illustrated in the lower portion of FIG. 18. The signal having the s-shaped waveform is set as an angle error signal of the reference beam, and is used for control of an element to change a reference beam angle of a galvanometer mirror or the like.

Here, the object lens 510 or an optical block 521 can be driven, for example, in a direction indicated by reference numeral 520. A relative position relation between the object lens 510 and a focal point on the back focus plane of the object lens 510 is changed by shifting the position of the object lens 510 or the optical block 521 along the drive direction 520. As a result, an angle of incidence of the reference beam incident on the hologram storage medium 1 can be set to a desired angle. The angle of incidence of the reference beam may be set to a desired angle by driving the mirror 514 with an actuator instead of driving the object lens 510 or the optical block 521.

In this way, the signal beam and the reference beam are incident on the hologram storage medium 1 while overlapping each other. As a result, an interference pattern is formed in the storage medium. Information is recorded by writing this pattern into the storage medium. Furthermore, since the angle of incidence of the reference beam incident on the hologram storage medium 1 can be changed by shifting the position of the object lens 510 or the optical block 521 along the drive direction 520, recording using angular multiplexing is possible.

When reproducing recorded information, a reference beam for reproducing is generated by causing the reference beam to be incident on the hologram storage medium 1 as described above and reflecting a light beam that has passed through the hologram storage medium 1 with a galvanometer mirror 516. A recovered beam reproduced by using the reproducing reference beam propagates through the object lens 510 and the angle filter 509. Then, the recovered beam passes through the PBS prism 507 and is incident on a photodetector 518, and the recorded signal can be reproduced.

A signal for servo control for controlling a galvanometer mirror 514 in order to set a reference beam angle is generated by an optical system above the disc 1, for example, as illustrated in the drawing. A recovered beam from hologram is converted to a parallel beam by the lens 326, and a part of a signal is shielded by the light-shielding mask 327. Resistance to the wavelength deviation or the angle deviation in a direction perpendicular to the multiplexing of the reference beam is improved due to the present light-shielding mask. Thereafter, the beam is converted to a convergent beam by, for example, a lens 328, and is then separated into a p-polarized beam and an s-polarized beam by a PBS prism 328. The respective beams are detected by photodetectors 330 and 331. The signal for servo control is calculated by performing a differential operation of signals obtained by, for example, the photodetectors 330 and 331. In this case, the maximum values and the minimum value of the signals obtained by, for example, the photodetectors 330 and 331 may be corrected to be identical to each other and thereafter, the differential operation may be performed. In the case of using the control signal obtained by performing, for example, the differential operation as described above, the p-polarized beam and the s-polarized beam which are incident on a lower surface of the disc are applied in a state of being deviated from an optimal angle for reproducing hologram in opposite directions from each other. Also, in the case of reflecting the beam by a galvanometer mirror 516, an angle is changed so as to be an optimal angle for reproducing hologram.

The optical system illustrated in FIG. 4 has a configuration in which the signal beam and the reference beam are incident on the same object lens. As a result, the optical system illustrated in FIG. 4 has an advantage that it can be reduced in size remarkably as compared with the configuration of the optical system illustrated in FIG. 2.

Figure 5:
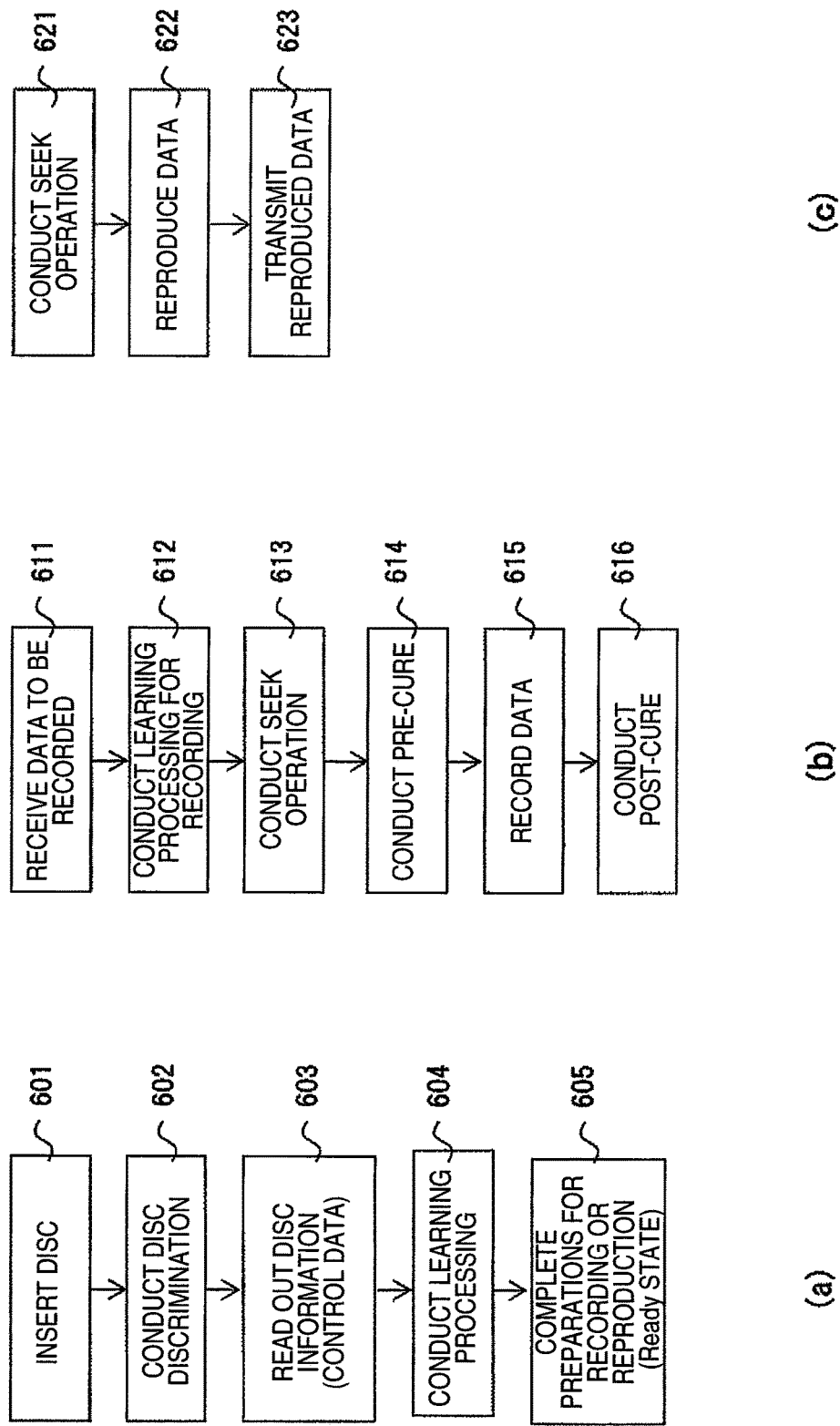
FIG. 5 is a schematic diagram illustrating an operation flow of the optical information recording/reproduction device.

FIG. 5 illustrates an operation flow of recording and reproducing in the optical information recording/reproduction device 10. In particular, a flow concerning recording and reproducing utilizing holography will now be described.

FIG. 5(a) illustrates a flow of operation conducted until preparations for, recording or reproducing are completed since the optical information storage medium 1 is inserted into the optical information recording/reproduction device 10. FIG. 5(b) illustrates a flow of operation conducted until information is recorded on the optical information storage medium 1 since a state in which the preparations are completed. FIG. 5(c) illustrates a flow of operation conducted until information recorded on the optical information storage medium 1 is reproduced since the state in which the preparations are completed.

As illustrated in FIG. 5(a), a medium is inserted (601). The optical information recording/reproduction device 10 conducts disc discrimination to determine whether, for example, the inserted medium is a medium on which recording or reproducing of digital information is conducted utilizing holography (602).

If it is determined as a result of the disc discrimination that the inserted medium is a medium on which recording or reproducing of digital information is conducted utilizing holography, the optical information recording/reproduction device 10 reads out control data provided on the optical information storage medium (603), and acquires, for example, information concerning the optical information storage medium and, for example, information concerning various setting conditions at the time of recording or reproducing.

After reading the control data, the optical information recording/reproduction device 10 conducts various adjustments according to the control data and learning processing concerning the pickup 11 (604), and completes preparations for recording or reproducing (605).

The flow of operation conducted until information is recorded since the preparation completion state is illustrated in FIG. 5(b). First, the optical information recording/reproduction device 100 receives data to be recorded (611), and sends information depending upon the data into the spatial light modulator in the pickup 11.

Then, the optical information recording/reproduction device 10 previously conducts various kinds of learning processing for recording such as, for example, power optimization of the light source 301 and optimization of exposure time using the shutter 303, as occasion demands in order to make it possible to record high quality information on the optical information storage medium (612).

Then, in seek operation (613), the optical information recording/reproduction device 10 controls the access control circuit 81 to position the pickup 11 and the cure optical system 13 in predetermined positions on the optical information storage medium. In a case where the optical information storage medium 1 has address information, the optical information recording/reproduction device 10 reproduces address information and ascertains whether the pickup 11 and the cure optical system 13 are positioned in target positions. Unless the pickup 11 and the cure optical system 13 are positioned in target positions, the optical information recording/reproduction device 10 calculates a deviation from a predetermined position and repeats the operation of positioning again.

Then, the optical information recording/reproduction device 10 pre-cures a predetermined area by using the light beam emitted from the cure optical system 13 (614), and records data by using the reference beam and the signal beam emitted from the pickup 11 (615).

After recording data, the optical information recording/reproduction device 10 conducts post-cure by using the light beam emitted from the cure optical system 13 (616). The optical information recording/reproduction device 10 may verify data as occasion demands.

The flow of operation conducted until recorded information is reproduced since the preparation completion state is illustrated in FIG. 5(c). First, in seek operation (621), the optical information recording/reproduction device 10 controls the access control circuit 81 to position the pickup 11 and the reproducing reference beam optical system 12 in predetermined positions on the optical information storage medium. In a case where the optical information storage medium 1 has address information, the optical information recording/reproduction device 10 reproduces address information and ascertains whether the pickup 11 and the reproducing reference beam optical system 12 are positioned in target positions. Unless the pickup 11 and the reproducing reference beam optical system 12 are positioned in target positions, the optical information recording/reproduction device 10 calculates a deviation from a predetermined position and repeats the operation of positioning again.

Then, the optical information recording/reproduction device 10 emits the reference beam from the pickup 11, reads out information recorded on the optical information storage medium (622), and transmits reproduced data (613).

FIG. 8 illustrates a data processing flow at the time of recording and reproducing. FIG. 8(a) illustrates a flow of recording data processing in the signal generation circuit 86 conducted after receiving 611 of recording data in the input/output control circuit 90 until the recording data is converted to two-dimensional data on the spatial light modulator 312. FIG. 8(b) illustrates a flow of reproduced data processing in the signal processing circuit 85 after detection of two-dimensional data in the photodetector 325 until reproduced data transmission 624 in the input/output control circuit 90.

Data processing at the time of recording will now be described with reference to FIG. 8(a). Upon receiving user data (901), the user data is divided into a plurality of data strings and each data string is converted to CRC to make it possible to conduct error detection at the time of reproducing (902). With the object of making the number of on-pixels nearly equal to the number of off-pixels and preventing the same pattern from being repeated, scrambling of adding a pseudo random number data string to each data string is conducted (903). Then, error correction coding using the Reed-Solomon code or the like is conducted to make it possible to conduct error correction at the time of reproducing (904). Then, the data string is converted to M*N two-dimensional data and the conversion is repeated for one page data. Thereby, two-dimensional data corresponding to one page is constituted (905). Markers which become reference in image position detection and image distortion correction at the time of reproducing are added to the two-dimensional data constituted in this way (906). Resultant data is transferred to the spatial light modulator 312 (907).

The data processing flow at the time of reproducing will now be described with reference to FIG. 8(b). Image data detected by the photodetector 325 is transferred to the signal processing circuit 85 (911). An image position is detected by using markers included in the image data as reference (912). Distortions such as an inclination, a magnification and distortion of the image are corrected (913). Then, binarization processing is conducted (914). Markers are removed (915), and thereby two-dimensional data corresponding to one page is acquired (916). The two-dimensional data obtained in this way is converted to a plurality of data stings, and then error correction processing is conducted (917). And a parity data string is removed. Then, descrambling processing is conducted (918). Error detection processing using the CRC is conducted (919). After CRC parities are removed, user data is transmitted via the input/output control circuit 90 (920).

Figure 6:
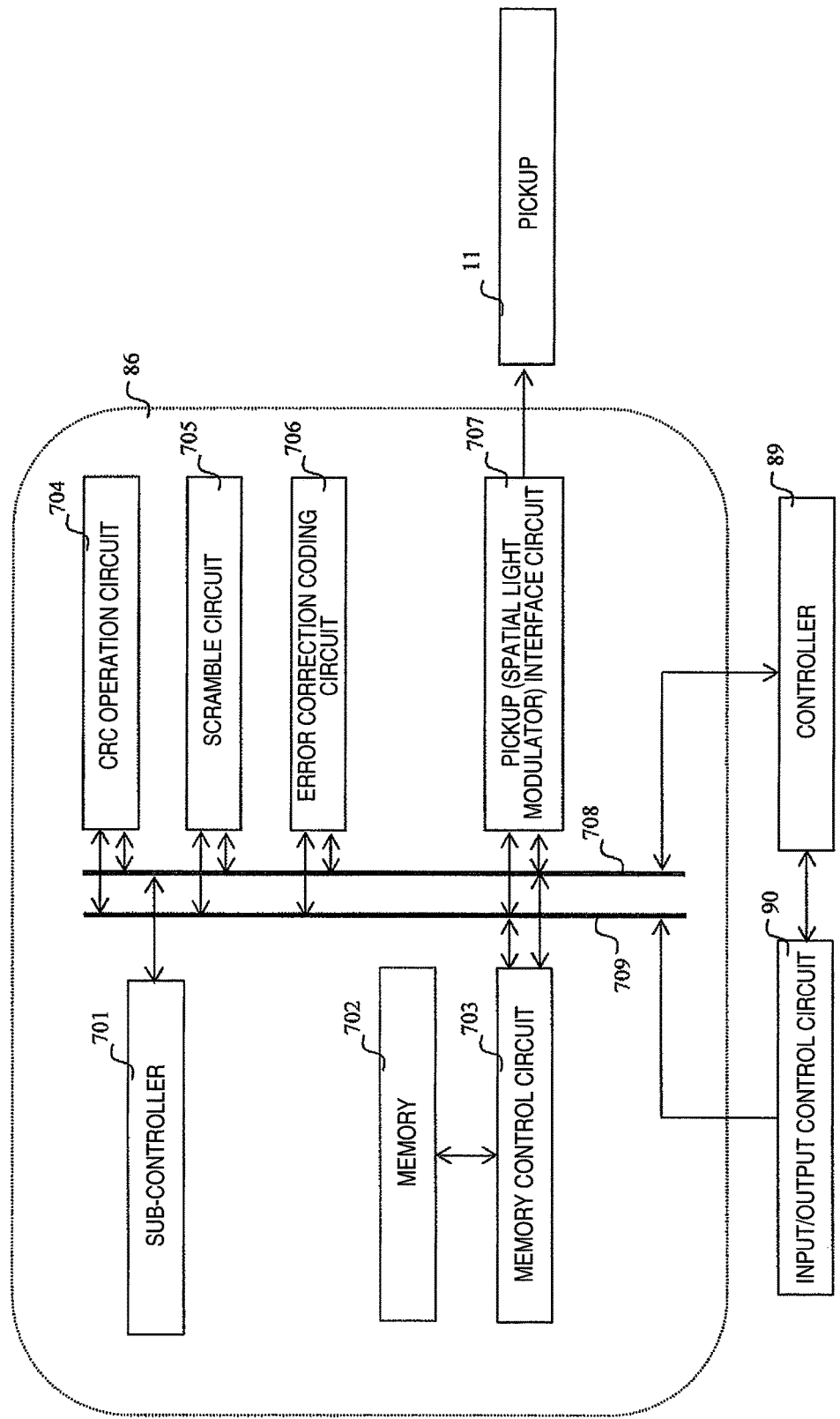
FIG. 6 is a schematic diagram illustrating an embodiment of a signal generation circuit in the optical information recording/reproduction device.

FIG. 6 is a block diagram of the signal generation circuit 86 in the optical information recording/reproduction device 10.

When input of user data to the output control circuit 90 is started, the input/output control circuit 90 gives a notice that input of user data is started to the controller 89. Upon receiving the notice, the controller 89 instructs the signal generation circuit 86 to conduct recording processing of data corresponding to one page which is input from the input/output control circuit 90. The processing instruction from the controller 89 is given to a sub-controller 701 in the signal generation circuit 86 via a control line 708. Upon receiving the instruction, the sub-controller 701 controls respective signal processing circuits via the control line 708 to cause the respective signal processing circuits to operate in parallel. First, the sub-controller 701 controls a memory control circuit 703 to store user data which is input from the input/output control circuit 90 via a data line 709 into a memory 702. If user data stored in the memory 702 amounts to a certain determinate quantity, a CRC operation circuit 704 exercises control to convert user data to CRC. Then, a scramble circuit 705 conducts scrambling to add a pseudo random number data string to data converted to CRC. An error correction coding circuit 706 exercises control to conduct error correction coding of adding a parity data string. Finally, a pickup interface circuit 707 reads out data subjected to error correction coding from the memory 702 in an arrangement order of two-dimensional data on the spatial light modulator 312, adds markers, which become reference at the time of reproducing, to the two-dimensional data, and then transfers resultant two-dimensional data to the spatial light modulator 312 in the pickup 11.

Figure 7:
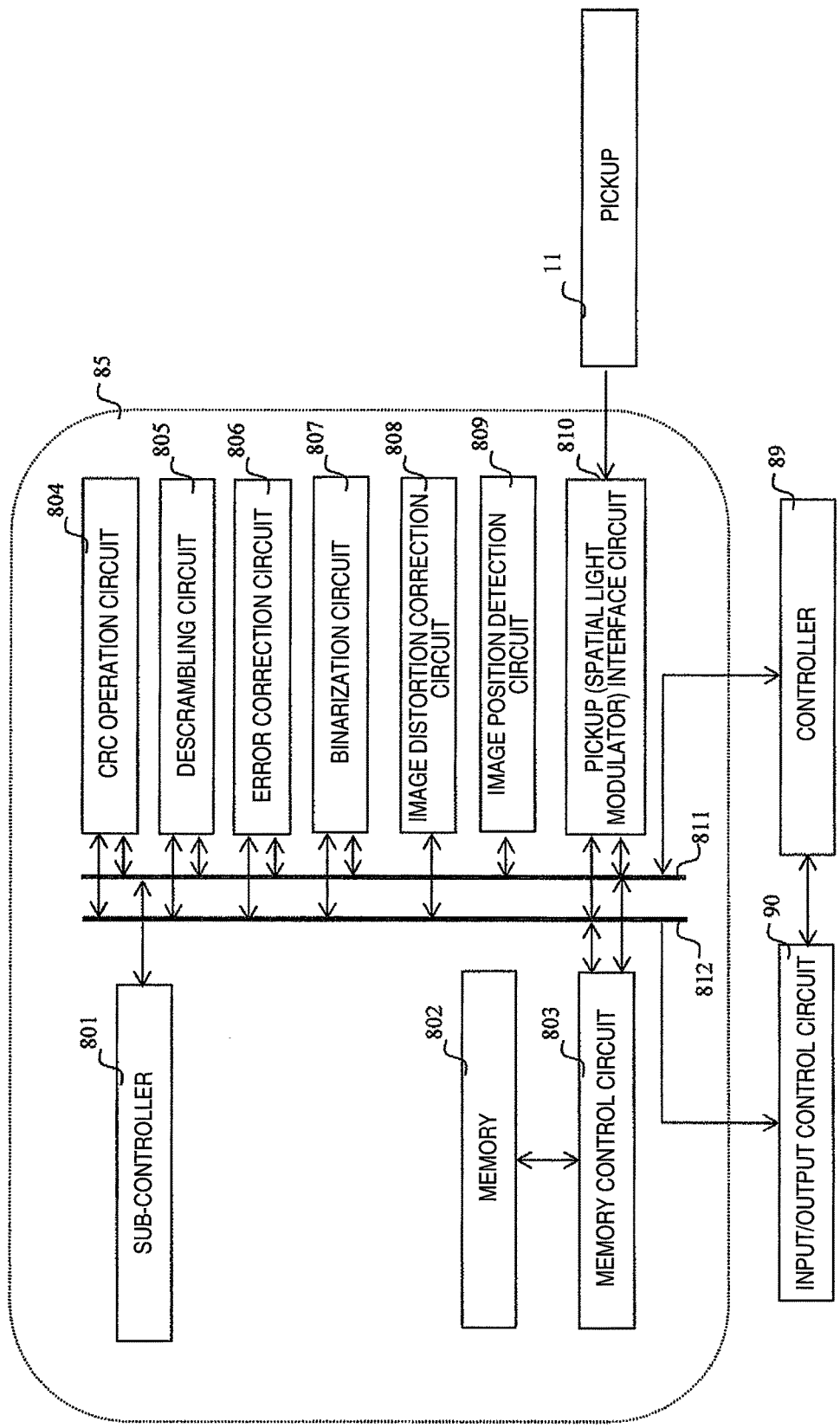
FIG. 7 is a schematic diagram illustrating an embodiment of a signal processing circuit in the optical information recording/reproduction device.

FIG. 7 is a block diagram of the signal processing circuit 85 in the optical information recording/reproduction device 10.

If the photodetector 325 in the pickup 11 detects image data, the controller 89 instructs the signal processing circuit 85 to conduct reproducing processing on data corresponding to one page which is input from the pickup 11. The processing instruction from the controller 89 is given to a sub-controller 801 in the signal processing circuit 85 via a control line 811. Upon receiving the instruction, the sub-controller 801 controls respective signal processing circuits via the control line 811 to operate the signal processing circuits in parallel. First, the sub-controller 801 controls a memory control circuit 803 to store image data, which is input from the pickup 11 via a pickup interface circuit 810 and a data line 812, into a memory 802. If data stored in the memory 802 amounts to a certain determinate quantity, the image position detection circuit 809 exercises control of detecting markers from image data stored in the memory 802 and extracting an effective data range. Then, an image distortion correction circuit 808 exercises control of conducting correction of distortions such as an inclination, a magnification and distortion of the image by using the detected markers and converting the image data to an expected size of two-dimensional data. A binarization circuit 807 exercises control of conducting binarization by determining whether each bit data in a plurality of bits included in two-dimensional data subjected to the size conversion is "0" or "1" and storing resultant data onto the memory 802 in an arrangement of output of reproduced data. Then, an error correction circuit 806 corrects an error included in each data string. A descrambling circuit 805 cancels scrambling which adds a pseudo random number data string. Then, a CRC operation circuit 804 confirms that an error is not contained in user data on the memory 802. Then, user data is transferred from the memory 802 to the input/output control circuit 90.

Figure 9:
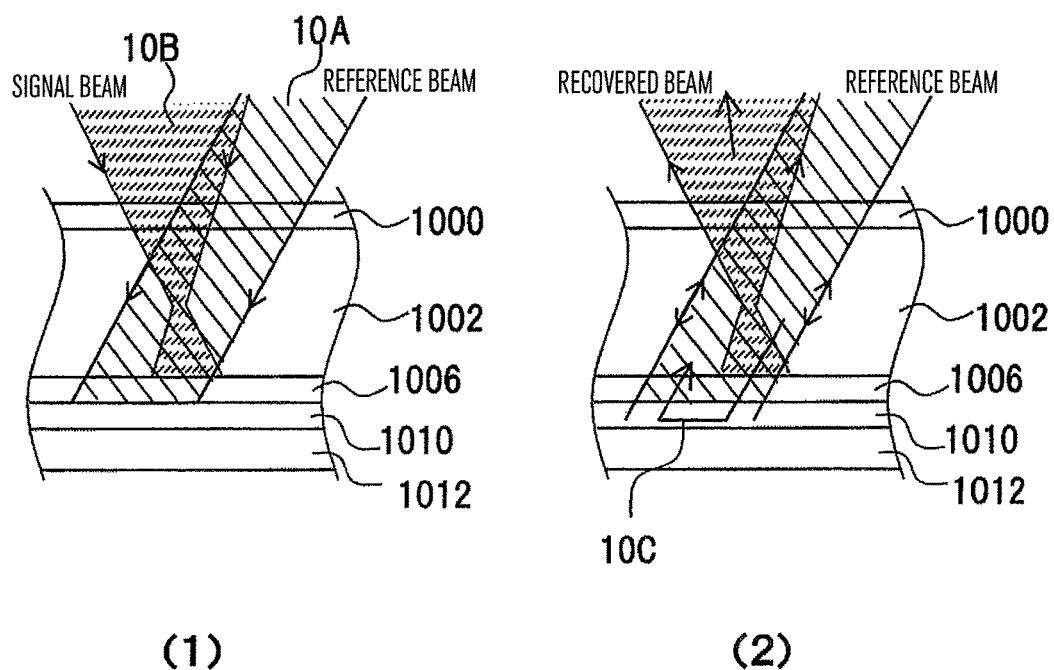
FIG. 9 is a schematic diagram illustrating an embodiment of a layer structure of optical information storage medium having a reflection layer.

FIG. 9 is a diagram illustrating a layer structure of optical information storage medium having a reflection layer. In FIG. 9, (1) indicates a state in which information is being recorded in the optical information storage medium, and (2) indicates a state in which information is being reproduced from the optical information storage medium.

The optical information storage medium 1 includes a transparent cover layer 1000, a recording layer 1002, an optical absorption/optical transmission layer 1006, an optical reflection layer 1010, and a third transparent protection layer 1012 in order from the optical pickup 11 side. An interference pattern between a reference beam 10A and a signal beam 10B is recorded in the recording layer 1002.

The optical absorption/optical transmission layer 1006 changes in physical properties to absorb the reference beam 10A and the signal beam 10B at the time of information recording and transmit the reference beam at the time of information reproducing. For example, the coloring/decolorizing state of the optical absorption/optical transmission layer 1006 is changed by applying a voltage to the optical storage medium 1. In other words, at the time of information recording, the optical absorption/optical transmission layer 1006 assumes the coloring state and absorbs the reference beam 10A and the signal beam 10B which have passed through the recording layer 1002. At the time of information reproducing, the optical absorption/optical transmission layer 1006 assumes the decolorizing state and transmits the reference beam (T. Ando et al.: Technical Digest ISOM (2006), Th-PP-10). The reference beam 10A which has passed through the optical absorption/optical transmission layer 1006 is reflected by the optical reflection layer 1010 and becomes a reference beam for reproducing 10C.

Furthermore, WO3 functioning as an electrochromic (EC) material described in A. Hirotsune et al.: Technical Digest ISOM (2006), Mo-B-04 can be used in the optical absorption/optical transmission layer 1006.

Coloring and decolorizing are caused reversibly by applying a voltage to this material. At the time of information recording, coloring is caused and the beam is absorbed. At the time of information reproducing, decolorizing is caused and the beam is transmitted.

Owing to the configuration illustrated in FIG. 9, the reference beam optical system for reproducing becomes unnecessary and size shrinking of the drive becomes possible.

Figure 10:
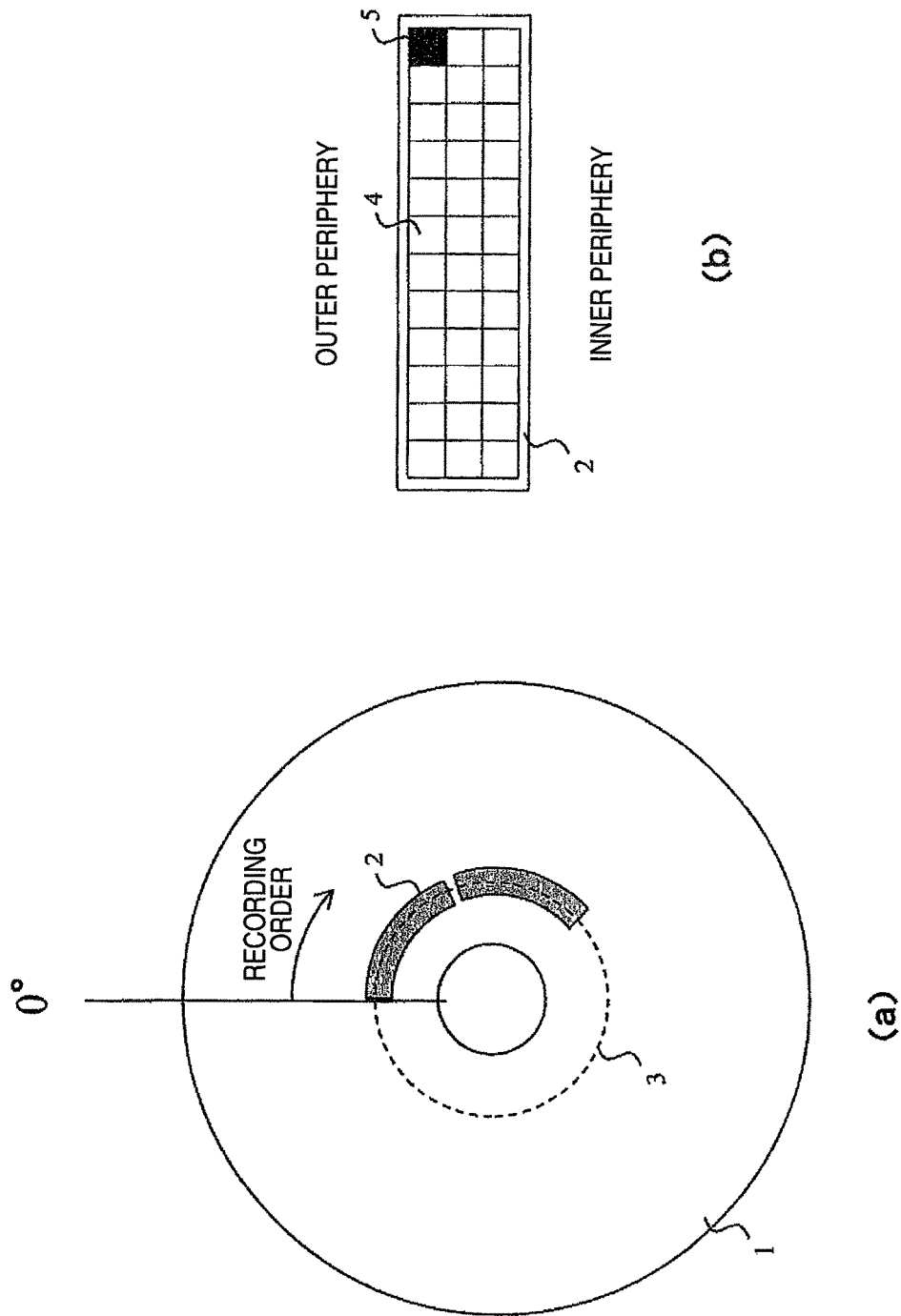
FIG. 10 is a schematic diagram illustrating embodiments of an optical information storage medium and a bookcase.

FIG. 10 is a schematic diagram illustrating embodiments of an optical information storage medium and a bookcase.

FIG. 10(a) illustrates a schematic diagram of an embodiment of the optical information storage medium. In the optical information storage medium 1, tracks 3 are arranged, for example, concentrically and bookcases 2 are recorded on the tracks. The bookcase is a minimum unit that is recordable during a recording session and is configured by a plurality of books. For example, as illustrated in the drawing, gaps are arranged between the bookcases. When data is recorded in the optical information storage medium, the bookcases are recorded clockwise from, for example, inner-periphery side tracks. When a bookcase is recorded initially in a track, for example, rotation angle positions of the optical information storage medium are homogenized and recording is then performed. Recording start positions of the tracks are indicated by a straight line at 0° in the drawing.

FIG. 10(b) illustrates a schematic diagram of an embodiment of the bookcase. A bookcase 2 includes, for example, a plurality of books 4 and a management region 5. Information related to, for example, the optical information storage medium or so-called management information are recorded in the management region, the management information including information related to an optical information recording/reproduction device which performs recording or reproduction, various setting conditions of recording or reproduction, environment information, such as a temperature, a humidity, and a date, at the time of recording or reproduction, information related to physical addresses or logical addresses, information on a medium format, information on defect positions, or information on alternative regions. The management region is not used for recording of user data. The management region is disposed at a right end portion on the outermost periphery side of the bookcase. Furthermore, at the time of reproduction, for example, the management region is initially searched and reproduced.

A method of searching the management region will be described. Since the management region is recorded in the end portion of the bookcase as described above, it is desirable to search a boundary between a recorded region and an unrecorded region.

Figure 11:
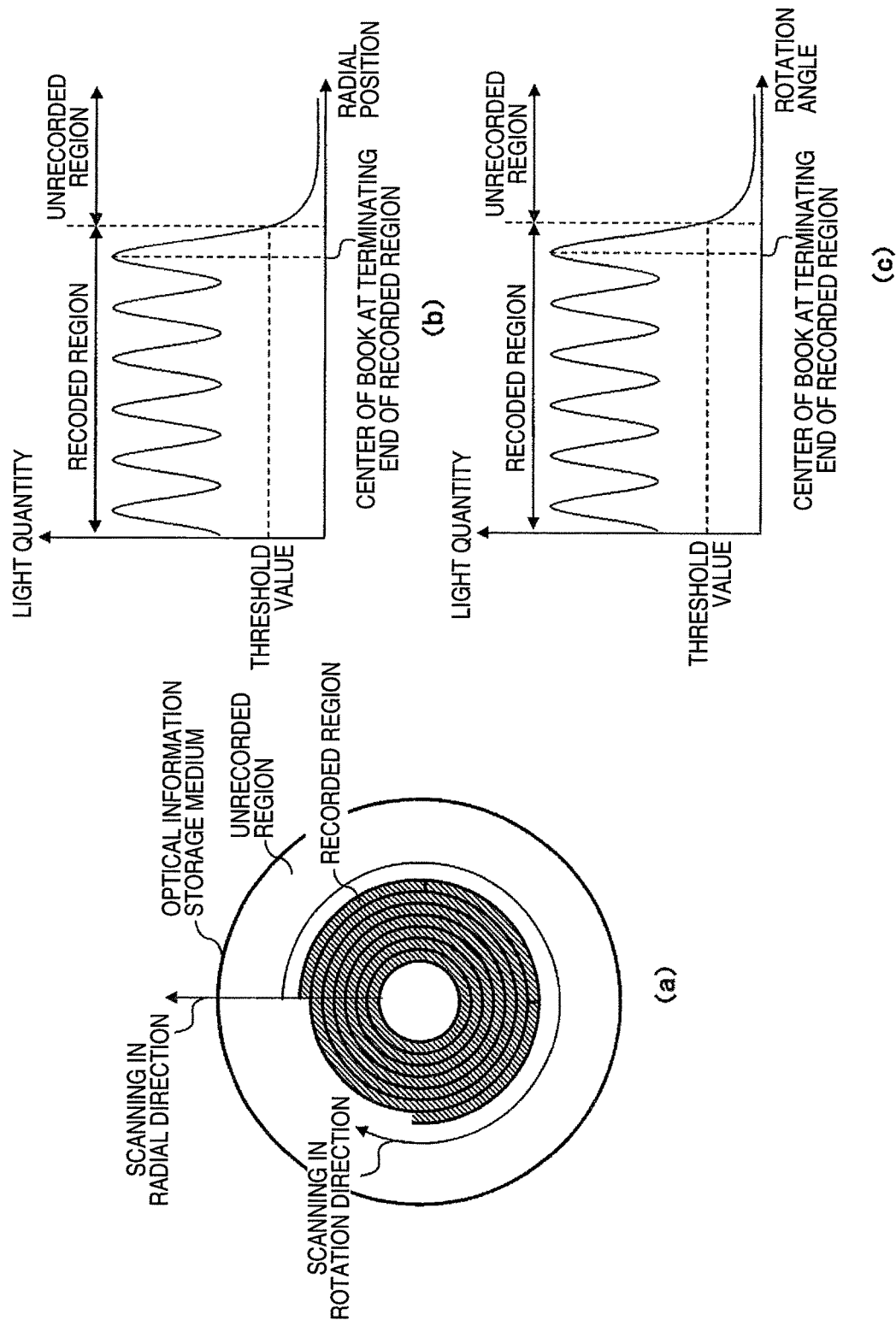
FIG. 11 is a schematic diagram illustrating examples of a relationship between positions of recorded regions and unrecorded regions and a light quantity detected at the time of scanning.

FIG. 11 is a schematic diagram illustrating examples of a relationship between positions of recorded regions and unrecorded regions and a light quantity detected at the time of scanning.

FIG. 11(a) illustrates a recorded region and an unrecorded region in the optical information storage medium. It is assumed that the recorded region is disposed concentrically from the inner periphery toward the outer periphery of the optical information storage medium and recording is completed at the middle of a rotation angle in the outermost periphery of the recorded region.

FIG. 11(b) illustrates a light quantity obtained at the time of determining the outermost periphery of a recorded region by scanning the light quantity in a radial direction after the reference beam angle is shifted in a direction perpendicular to angular multiplexing. In the case of scanning the recorded region, a light quantity which is larger than a threshold value is always detected, and a peak of the light quantity is obtained each time it passes through a book. Since the light quantity is equal to or less than the threshold value in the case of having passed through the outermost periphery of the recorded region, this state is detected and it is determined that a position of the last peak of the light quantity is located in the outermost periphery of the recorded region.

FIG. 11(c) illustrates a light quantity obtained in the case of determining a terminating end of the recorded region by scanning the light quantity in a rotation direction. In the case of scanning the recorded region, a light quantity which is larger than a threshold value is always detected, and a peak of the light quantity is obtained each time it passes through a book. Since the light quantity is equal to or less than the threshold value in the case of having passed through the outermost periphery of the recorded region, this state is detected and it is determined that a position of the last peak of the light quantity is located in the terminating end of the recorded region.

As described above, it is possible to stably detect a boundary between the recorded region and the unrecorded region by shifting the reference beam angle in the direction perpendicular to angular multiplexing and scanning a light quantity, thereby enabling searching of the management region.

Figure 12:
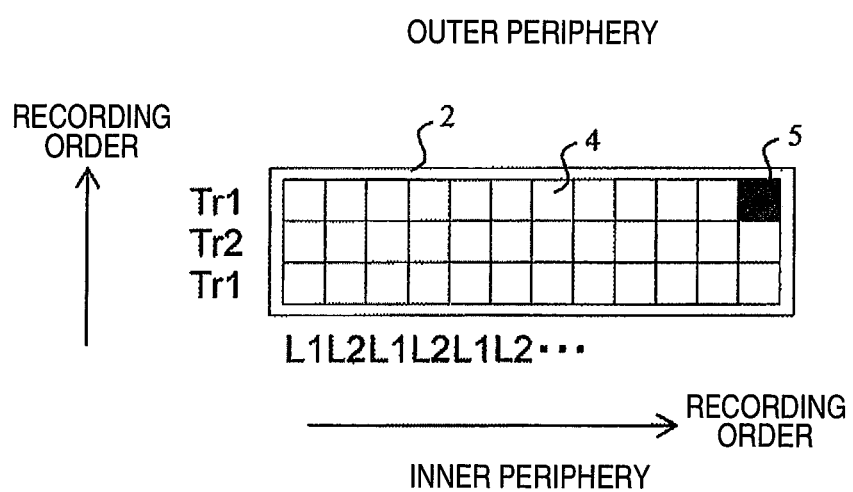
FIG. 12 is a schematic diagram illustrating an example of a book recording order in a bookcase in an optical information recording/reproduction device.

FIG. 12 is a schematic diagram illustrating an example of a book recording order in a bookcase in an optical information recording/reproduction device. For example, in the case of book recording, recording is executed on each of tracks indicated by Tr1 or Tr2. After recording is completed with respect to a certain track, movement to a next track is executed and recording is executed. Among the tracks, recording is first executed on, for example, odd-numbered tracks indicated by Tr1 and thereafter, recording is executed on even-numbered tracks indicated by Tr2. The reason for this is that a recording portion of the optical information storage medium tends to shrink due to recording, and it is necessary to make a shrunk state of adjacent tracks uniform and then perform recording. That is, recording is performed on Tr1 and is then performed on Tr2. In the case of recording for Tr1, recording can be performed on adjacent tracks on the inner periphery and outer periphery sides together in an un-shrunk state. In the case of recording for Tr2, recording can be performed on adjacent tracks on the inner periphery and outer periphery sides together in a shrunk state. The present technology is referred to as "skip sorting". Also, in the case of book recording in a track, recording is performed on, for example, a book indicated by L1 and is then performed on a book indicated by L2 due to the reason as described above. For example, L1 is referred to as a "layer 1" and L2 is referred to as a "layer 2". The present technology is referred to as "layer recording".

FIG. 13 is a diagram illustrating a simulation result of a relationship between a zero crossing point angle deviation quantity of a servo control signal of a galvanometer mirror and a wavelength deviation quantity. The servo control signal is generated by a differential operation of reproduced signals of the s-polarized beam and the p-polarized beam as described above. The zero crossing point angle deviation quantity can be represented by a difference between a crossing point between the control signal and a horizontal axis and an optimal angle as illustrated in the left drawing of FIG. 13. Here, the optimal angle, as illustrated in FIG. 18, for example, is an angle deviated from an angle at which a light quantity of a reproduced signal of the s-polarized beam becomes the maximum, that is, an angle at which an SNR of a certain reproduced signal becomes the maximum, by half the separation angle of the separation angle of the s-polarized beam and the p-polarized beam. Also, the angle may be an angle equal to or greater than a predetermined threshold value.

Figure 19:
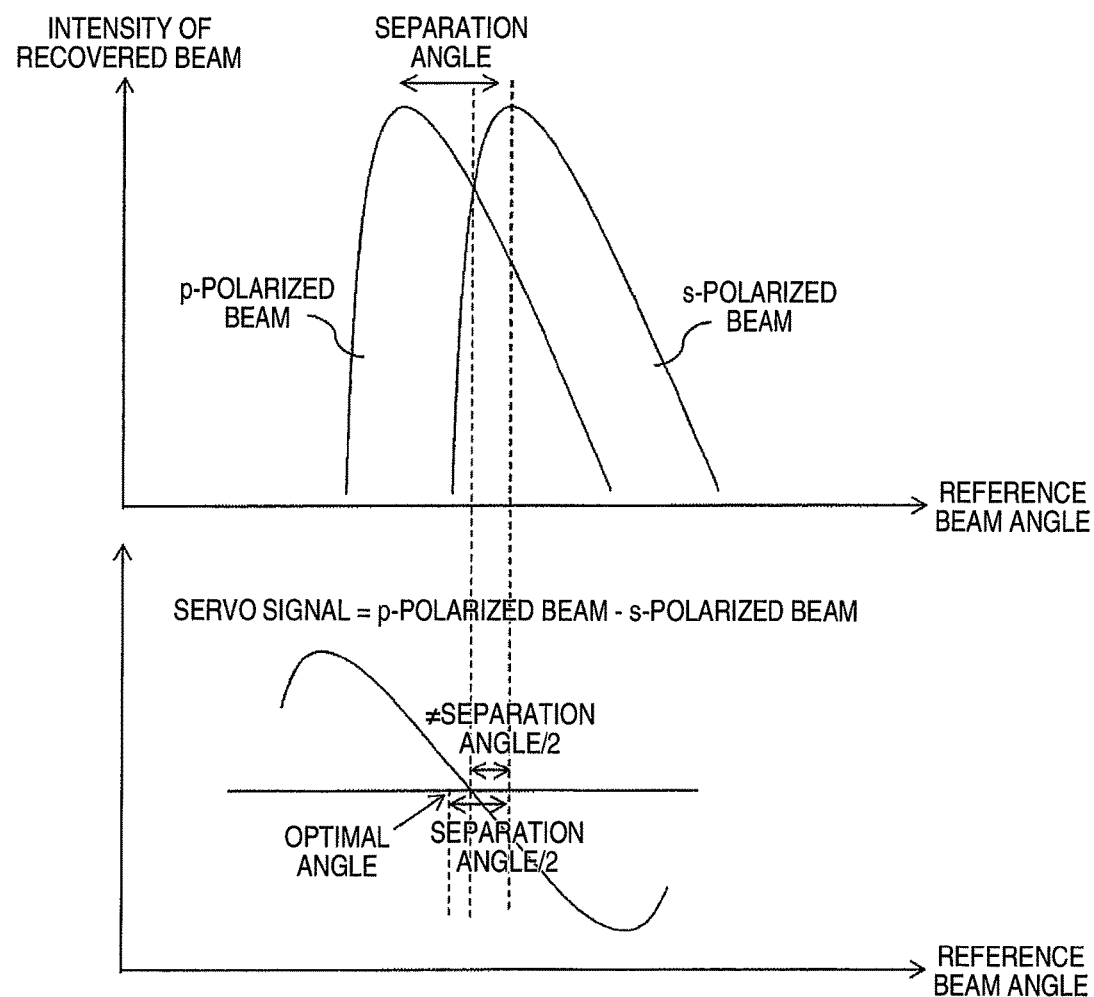
FIG. 19 is a diagram illustrating an example of a Bragg selective curve of a reproduced signal and an angle error signal (servo signal) of a reference beam in an optical information recording/reproduction device when a wavelength deviation occurs.

In a case in which there is no light-shielding mask 327 of FIGS. 2 to 4, as illustrated in the right drawing of FIG. 13, it can be seen from a simulation result that the zero crossing point angle deviation quantity increases as a wavelength deviation occurs. Since the reference beam angle is deviated from an optimal angle due to the zero crossing point angle deviation, this is a cause to reduce an SNR of the reproduced signal. In order to reduce the zero crossing point angle deviation quantity, a light-shielding mask is effective as described below. Also, the zero crossing point angle deviation is caused by the right-and-left asymmetry of a graph (Bragg selective curve) of the reference beam angle and a recovered beam strength of the s-polarized beam or the p-polarized beam as illustrated in FIG. 19. Generally, the Bragg selective curve is distorted right-left asymmetrically as illustrated in FIG. 19 in a case in which a wavelength deviation occurs. In this case, when an error signal of the reference beam angle is set by performing a differential operation of the s-polarized beam and the p-polarized beam, right-left symmetry is assumed, and therefore, an angle deviation at the zero crossing point occurs. A purpose of the present embodiment is to reduce the zero crossing point angle deviation quantity, and the present embodiment achieves the purpose by shielding a part of a reproduced page as described below. When the wavelength deviation occurs, in the reproduced page, brightness of the page is not uniformly reduced, and there are a region which is not sensitive to the wavelength deviation and a region which is sensitive to the wavelength deviation. Therefore, it is possible to reduce the zero crossing point angle deviation quantity by performing light shielding.

Figure 14:
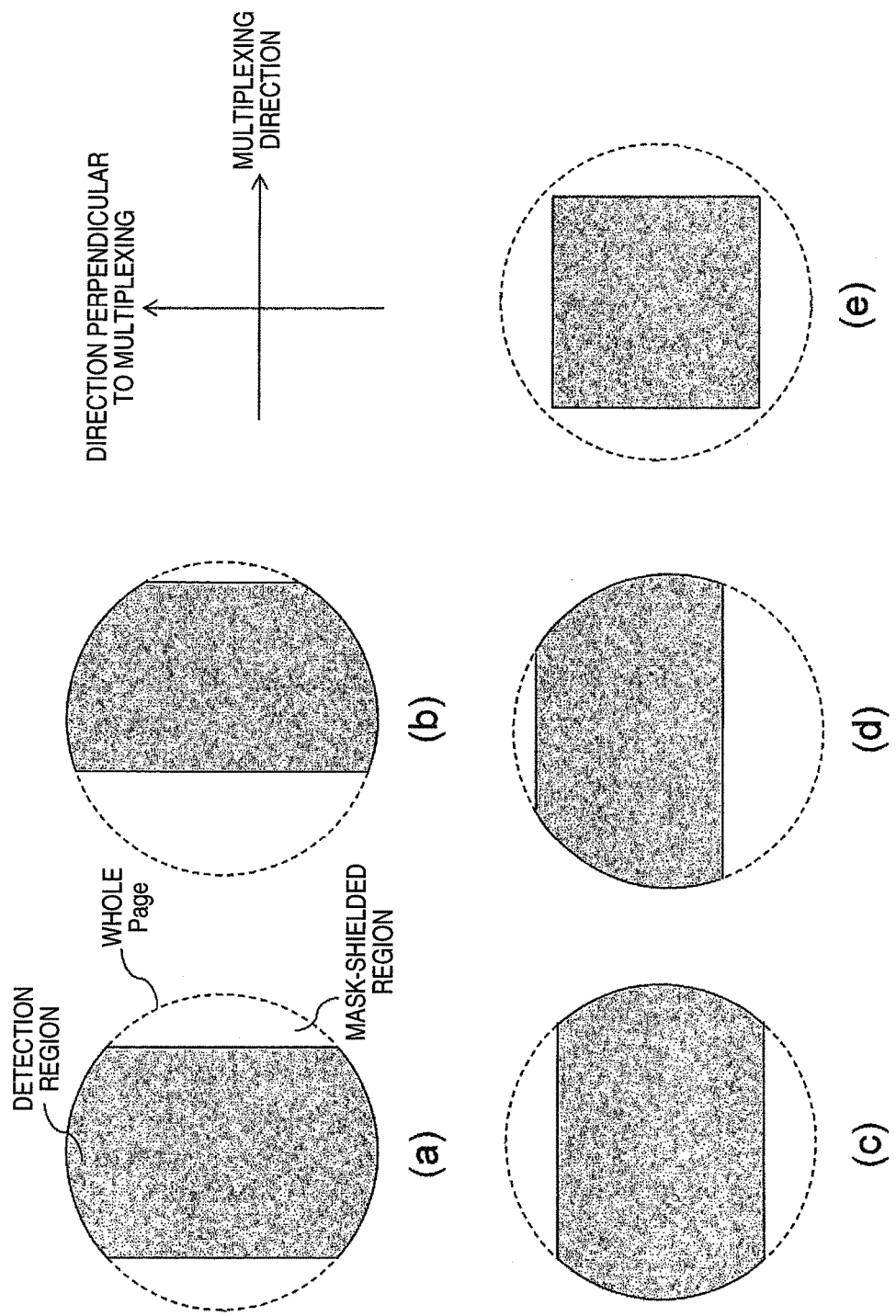
FIG. 14 is a schematic diagram illustrating an example of a detection shape of a detection page for generation of a servo control signal of a galvanometer mirror.

FIG. 14 is a schematic diagram illustrating an example of a detection shape of a detection page for generation of a servo control signal of a galvanometer mirror. In order to improve resistance to a wavelength deviation in the servo control signal of the galvanometer mirror, both ends of the detection page in a multiplexing direction is shielded by a predetermined size through a light-shielding mask as illustrated in, for example, FIG. 14(a), and the servo control signal of the galvanometer mirror is generated. Also, as illustrated in FIG. 14(b), magnitudes of shielded-light quantities at the both ends may be exchanged. On the other hand, in order to improve resistance to an angle deviation in a direction perpendicular to multiplexing of a reference beam in the servo control signal of the galvanometer mirror, both ends of the detection page in a direction perpendicular to multiplexing is shielded by a predetermined size through a light-shielding mask as illustrated in, for example, FIG. 14(c), and the servo control signal of the galvanometer mirror is generated. In this case, similarly to FIG. 14(b), magnitudes of shielded-light quantities at the both ends may be exchanged. Also, in order to simultaneously improve both resistance to the wavelength deviation and resistance to the angle deviation in a direction perpendicular to the multiplexing of the reference beam, as illustrated in, for example, FIG. 14(e), light shielding may be performed in both the multiplexing direction and the direction perpendicular to the multiplexing. Furthermore, similarly to FIGS. 14(b) and 14(d), magnitudes of shielded-light quantities at the both ends may be exchanged in both the multiplexing direction and the direction perpendicular to the multiplexing. Disturbance resistance of a reproduced signal from hologram depends on an angle, and there is a case in which a recovered-beam quantity is changed due to a position in a page which is an aggregate of plane waves having different angles. As illustrated in FIG. 14(b) or 14(d), there is a case of improving resistance to disturbance, such as the wavelength deviation or the like, by making shield-light quantities asymmetric.

Figure 15:
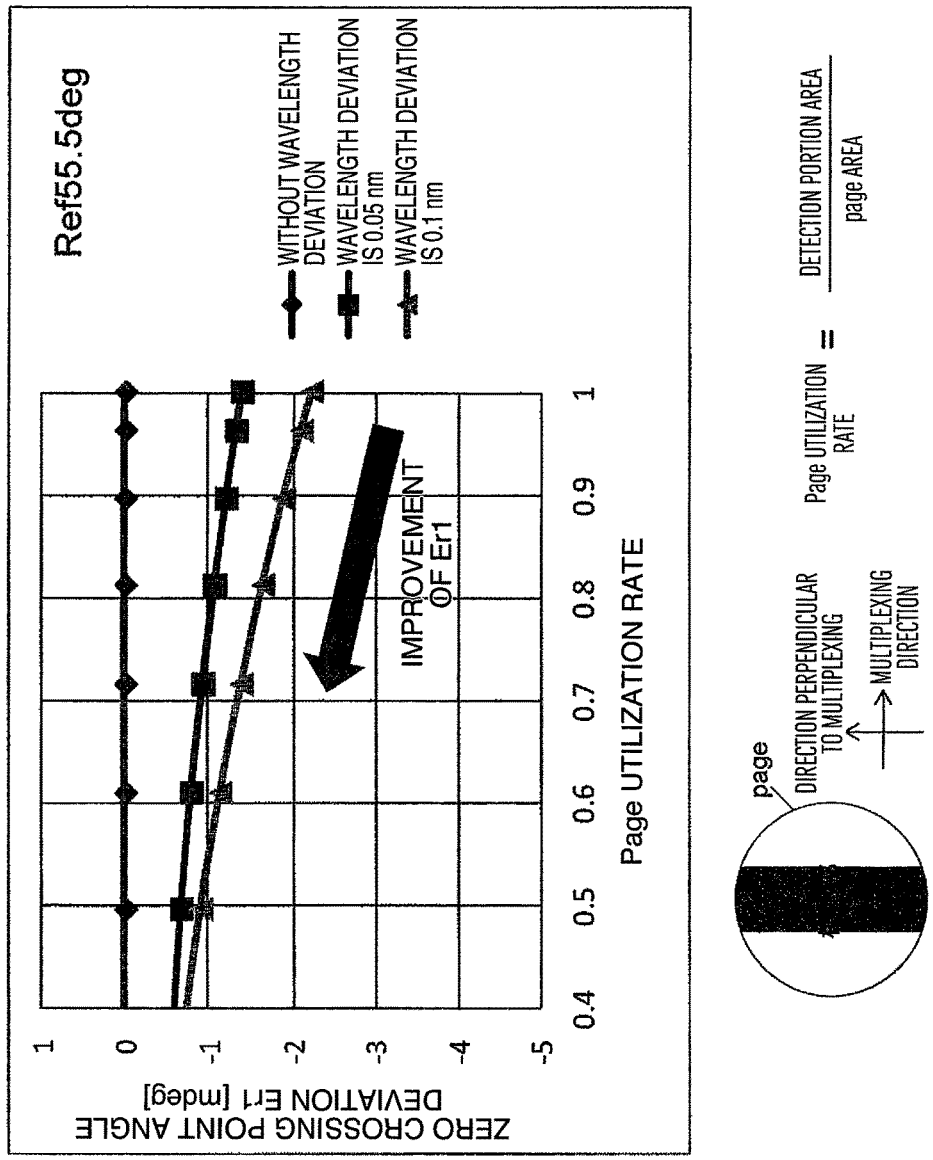
FIG. 15 is a diagram illustrating a simulation result of a relationship between a zero crossing point angle deviation quantity of a servo control signal of a galvanometer mirror and a page utilization rate (at the time of shielding edge portions in a multiplexing direction).

FIG. 15 is a diagram illustrating a simulation result of a relationship between a zero crossing point angle deviation quantity of a servo control signal of a galvanometer mirror and a page utilization rate (at the time of shielding edge portions in a multiplexing direction). The page utilization rate is represented by a value obtained by dividing an area of a detection portion of a light-shielding mask passing part by a whole area of a page. As illustrated in FIG. 14(a), the present simulation result illustrates a result in a case in which both ends in a multiplexing direction are shielded by a light-shielding mask and shielded light quantities at the both ends are equal to each other. It can be seen from FIG. 15 that the zero crossing point angle deviation caused by the wavelength deviation is improved depending on a reduction in the page utilization rate. That is, it is possible to improve resistance to the wavelength deviation in the servo control signal of the galvanometer mirror by appropriately shielding the both ends of a detected page in the multiplexing direction.

Figure 16:
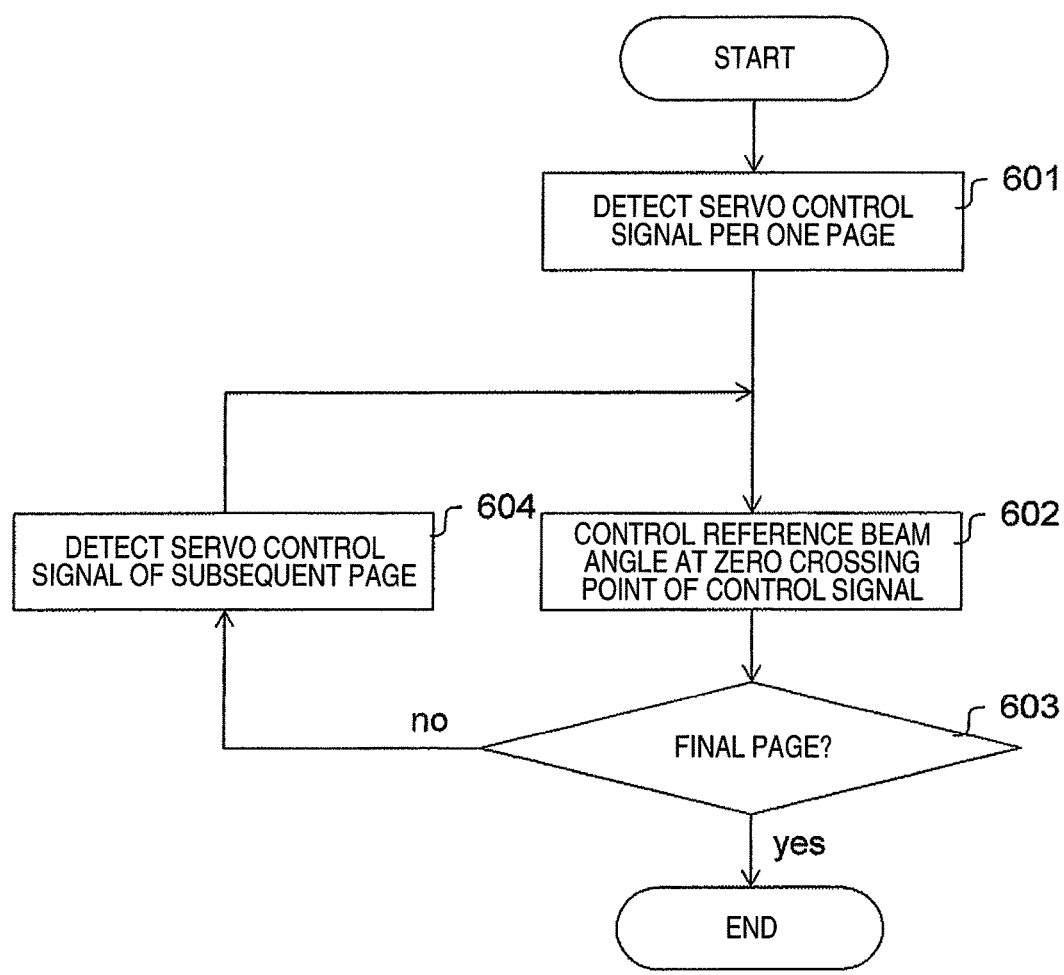
FIG. 16 is a diagram illustrating an embodiment of a flow of setting a reference beam angle at the time of reproduction in an optical information recording/reproduction device.

FIG. 16 illustrates an embodiment of a flow of setting a reference beam angle at the time of reproduction in an optical information recording/reproduction device. First, a servo control signal per one page is detected at 601. As to determination of one page, one page is determined when an initial servo control signal is obtained while changing, for example, a galvanometer such that the reference beam angle is gradually changed from the minimum value to the maximum value. Thereafter, the reference beam angle is controlled at a zero crossing point of the control signal by 602, and reproduction of a corresponding page is performed. In this case, for example, a mirror for phase conjugation reproduction is set to be an average angle of angles of the s-polarized beam and the p-polarized beam. Subsequently, determination of whether a page is a final page is performed by 603, and when the page is the final page, processing is ended. When the page is not the final page, movement to a servo control signal of a subsequent page is performed by 604, and processing after 602 is continuously performed.

According to the method of the present embodiment, there is an advantage that a light-shielding position deviation error does not occur due to the light-shielding mask between the s-polarized beam and the p-polarized beam since the light-shielding mask shields a part of a reproduced signal before separation by the PBS prism 329.

Also, the light-shielding mask may be configured to be shifted according to a position deviation of the optical information storage medium. At the time of shift, an appropriate movement amount of the light-shielding mask with respect to, for example, a movement amount of the optical information storage medium is previously determined through learning or the like, and the light-shielding mask is shifted by, for example, an actuator with reference to a position error signal of the optical information storage medium.

In the ensuing description, description of contents common to the present embodiment will be omitted.

Embodiment 2

A second embodiment of the present invention will be described with reference to FIG. 17. Since a device configuration is realized by using the same configuration as the first embodiment, a description thereof will be omitted.

Figure 17:
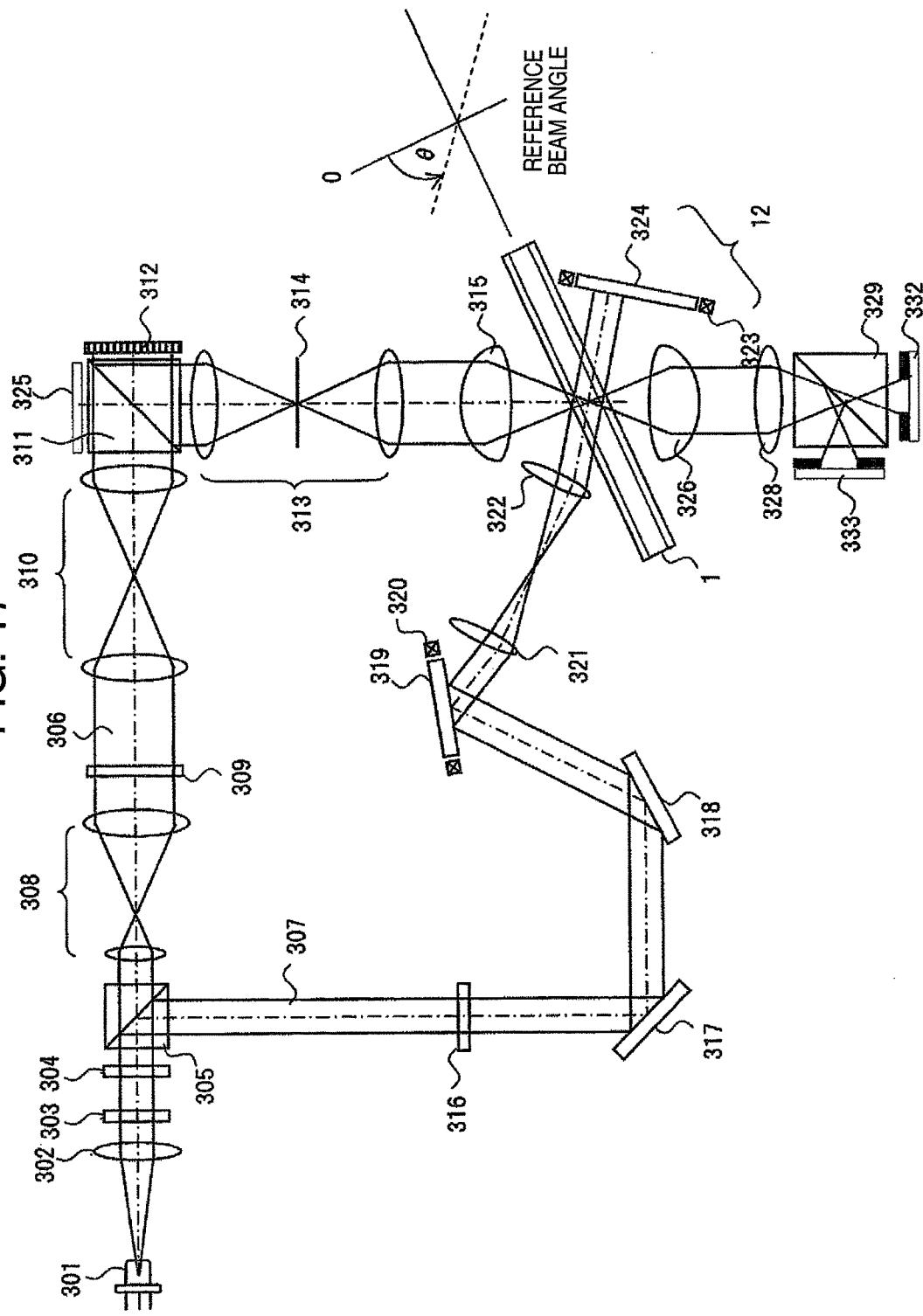
FIG. 17 is a schematic diagram illustrating an embodiment of a pickup of an optical information recording/reproduction device.

FIG. 17 is a schematic diagram illustrating an embodiment of a pickup of an optical information recording/reproduction device. FIG. 17 differs from FIG. 2 or 3 in that a light-shielding mask 327 does not exist between the lens 326, and the lens 328 and the photodetector 330 and the photodetector 331 are substituted with a light-shielding mask-attached photodetector 332 and a light-shielding mask-attached photodetector 333. Also, in the method of the present embodiment, a position of the light-shielding mask-attached photodetector is arranged at a position which is defocused from a focal point by the lens 326. The light-shielding mask-attached photodetector may be constructed to restrict a pixel used in a control signal by using an image-capturing element, for example, a camera.

According to the method of the present embodiment, the light-shielding mask is disposed before the photodetector. Therefore, there is an advantage that the influence of light diffraction can be reduced by the light-shielding mask.

Also, the present invention is not limited to a case of detecting an angle error signal of an angle of a reference beam in a multiplexing direction and may be utilized for, for example, an angle error signal of a reference beam in a direction perpendicular to multiplexing, a position error signal of an optical information storage medium, or a position error signal of an aperture (spatial filter) disposed in a beam waist of a signal beam.

Furthermore, the present invention is not limited to angular multiplexing, and can be applicable other schemes (for example, shift multiplexing) when it is necessary to generate an error signal which reduces the influence of wavelength deviation.

The present invention is not restricted to the above-described embodiments, but various modifications are included. For example, the embodiments have been described in detail in order to describe the present invention intelligibly, and each of the embodiments is not necessarily restricted to the configuration having all described components. Furthermore, it is possible to replace a part of a configuration in an embodiment by a part of a configuration in another embodiment, and it is possible to add a part of a configuration in an embodiment to a configuration in another embodiment. Furthermore, as for a part of a configuration in each embodiment, it is possible to conduct addition, deletion, and replacement of a part of a configuration in another embodiment.

Furthermore, as for each of the above-described configurations, functions, processing units, and processing means, a part or the whole thereof may be implemented by hardware by, for example, designing using integrated circuits. Each of the above-described configurations, functions, and the like may be implemented by software by using a processor which interprets and executes a program implementing each function. Information such as a program, a table, and a file implementing each function can be stored in a storage device such as a memory, a hard disc, or an SSD (Solid State Drive) or a storage medium such as an IC card, an SD card, or a DVD.

Furthermore, as for control lines and information lines, those considered to be necessary for description are illustrated. All control lines and information lines on products are not necessarily illustrated. As a matter of fact, it may be considered that almost all components are connected to each other.

REFERENCE SIGNS LIST

1 Optical information storage medium
2 Bookcase
3 Track
4 Book
5 Management region
10 Optical information recording/reproduction device
11 Pickup
12 Reproducing reference beam optical system
13 Disc cure optical system
14 Disc rotation angle detecting optical system
81 Access control circuit
82 Light source drive circuit
83 Servo signal generation circuit
84 Servo control circuit
85 Signal processing circuit
86 Signal generation circuit
87 Shutter control circuit
88 Disc rotary motor control circuit
89 Controller
90 Input/output control circuit
91 External control device
301 Light source
302 Collimating lens
303 Shutter
304 Half-wave plate
305 Polarization beam splitter
306 Signal beam
307 Reference beam
308 Beam expander
309 Phase mask
310 Relay lens
311 PBS prism
312 Spatial light modulator
313 Relay lens
314 Spatial filter
315 Object lens
316 Polarization direction conversion element
317 Mirror
318 Mirror
319 Mirror
320 Actuator
321 Lens
322 Lens
323 Actuator
324 Mirror
325 Photodetector
326 Lens
327 Light-shielding mask
328 Lens
329 PBS prism
330 Photodetector
331 Photodetector
332 Light-shielding mask attached photodetector
333 Light-shielding mask attached photodetector
334 Wavelength plate
335 Polarization separation element
501 Light source
502 Collimating lens
503 Shutter
504 Optical element
505 PBS prism
506 Signal beam
507 PBS prism
508 Spatial light modulator
509 Angle filter
510 Object lens
511 Object lens actuator
512 Reference beam
513 Mirror 514 Mirror
515 Lens
516 Galvanometer mirror
517 Actuator
518 Photodetector
519 Polarization direction conversion element
520 Drive direction
521 Optical block

The invention claimed is:

1. An optical information reproduction device which reproduces information from an optical information storage medium by using holography, comprising:
   a laser light source for generating a reference beam;
   an image-capturing unit for detecting a diffracted beam to be reproduced from the optical information storage medium;
   an optical detection unit having at least two light-receiving surfaces and used for detecting a diffracted beam reproduced by irradiating the optical information storage medium with the reference beam;
   a light-shielding unit for shielding a part of the diffracted beam detected by the optical detection unit; and
   an error signal calculation unit for generating an angle error signal from a detection signal outputted by the optical detection unit,
   wherein the light-shielding part is disposed at a position other than a focal point of the diffracted beam, and shields at least one end in a multiplexing direction of the diffracted beam detected by the optical detection unit or in a direction perpendicular to the multiplexing direction,
   wherein the optical detection unit outputs different detection signals with respect to reference beams having different angles, and
   wherein the angle error signal calculation unit generates the angle error signal of the reference beam based on the a differential operation signal of at least two detection signals output from the optical detection unit.

2. The optical information reproduction device according to claim 1, further comprising an angle adjusting unit for adjusting an angle of the reference beam,
   wherein the optical detection unit detects a diffracted beam reproduced by irradiating the optical information storage medium with the adjusted reference beam.

3. The optical information reproduction device according to claim 2, further comprising an optical axis branching unit for branching the reference beam into at least two reference beams having different angles,
   wherein the optical detection unit detects a diffracted beam reproduced by irradiating the optical information storage medium with the branched reference beam,
   the error signal calculation unit generates an angle error signal of the reference beam from a detection signal output by the optical detection unit, and
   the angle adjusting unit adjusts an angle of the reference beam based on the angle error signal output from the angle error signal calculation unit.

4. The optical information reproduction device according to claim 3, further comprising a reflection unit for reflecting a reference beam so as to have an optimal angle, the reference beam being incident on and passes through the optical information storage medium in a state in which an angle of the reference beam is deviated from the optimal angle,
   wherein the image-capturing unit detects a diffracted beam reproduced from the optical information storage medium by the reference beam reflected so as to have the optimal angle.

5. The optical information reproduction device according to claim 3, wherein the angle adjusting unit adjusts an angle of the reference beam based on the angle error signal output from the angle error signal calculation unit and thereafter, and sets an angle obtained by changing an reference beam angle by a predetermined angle as the optimal angle,
   further comprising a reflection part for substantially perpendicularly reflecting a reference beam obtained by allowing the reference beam having the optimal angle to be incident on and pass through the optical information storage medium,
   wherein the image-capturing unit detects a diffracted beam reproduced from the optical information storage medium by the reflected reference beam.

6. The optical information reproduction device according to claim 1, wherein the light-shielding unit shields both ends in the multiplexing direction of the diffracted beam.

7. The optical information reproduction device according to claim 6, wherein the light-shielding unit shields the both ends with substantially equal area.

8. The optical information reproduction device according to claim 1, wherein the light-shielding unit shields both ends in the direction perpendicular to the multiplexing direction of the diffracted beam.

9. The optical information reproduction device according to claim 8, wherein the light-shielding unit shields the both ends with substantially equal area.

10. The optical information reproduction device according to claim 1, wherein the light-shielding unit shields both ends in the multiplexing direction of the diffracted beam, and both ends in the direction perpendicular to the multiplexing direction.

11. The optical information reproduction device according to claim 10, wherein the light-shielding unit shields both ends in the multiplexing direction of the diffracted beam, and both ends in the direction perpendicular to the multiplexing direction, by substantially equal area.

12. The optical information reproduction device according to claim 1, wherein the light-shielding unit includes at least a first light-shielding unit that is disposed on one of the at least two light-receiving surfaces and a second light-shielding unit that is disposed on the other of the at least two light-receiving surfaces of the optical detection unit, and
    the light-receiving surfaces receive the diffracted beam defocused from a focal point.

13. The optical information reproduction device according to claim 3, wherein the optical detection unit outputs different detection signals with respect to the reference beams having different angles, and
    the angle error signal calculation unit adjusts the detection signals output from the optical detection unit such that maximum values and minimum values are equal to one another and generates an angle error signal of the reference beam.

14. The optical information reproduction device according to claim 6, wherein the light-shielding unit asymmetrically shields both ends in the multiplexing direction of the diffracted beam.

15. The optical information reproduction device according to claim 8, wherein the light-shielding unit asymmetrically shields both ends in the direction perpendicular to the multiplexing direction of the diffracted beam.

16. The optical information reproduction device according to claim 1, further comprising a driving unit for driving the light-shielding unit; and
  a second detection unit for detecting a position error signal of the optical information storage medium,
  wherein the driving unit drives the light-shielding unit in response to the position error signal of the optical information storage medium.

17. An optical information reproduction method which reproduces information from an optical information storage medium by using holography, comprising:
  a light-emitting process of generating a reference beam;
  an angle adjusting process of adjusting an angle of the reference beam;
  a light-shielding process of shielding a part of a diffracted beam reproduced by irradiating the optical information storage medium with the reference beam;
  an optical detection process of detecting, by an optical detection unit having at least two or more light-receiving surfaces, the diffracted beam which is shielded; and
  an angle error signal calculation process of generating an angle error signal of the reference beam from a detection signal output in the optical detection process,
  wherein the optical detection process outputs different detection signals with respect to reference beams having different angles, and
  the angle error signal calculation process generates the angle error signal of the reference beam based on the a differential operation signal of at least two detection signals output in the optical detection process.

* * * * *